(12) United States Patent  
Akao et al.

(10) Patent No.: US 7,872,715 B2
(45) Date of Patent: Jan. 18, 2011

(54) LIQUID CRYSTAL DISPLAY DEVICE AND METHOD FOR MANUFACTURING THE SAME

(75) Inventors: Sosuke Akao, Tokyo (JP); Hironobu Suda, Tokyo (JP); Yuji Kubo, Tokyo (JP); Godai Fukunaga, Tokyo (JP); Kazuhiro Osato, Tokyo (JP); Yuki Yasu, Tokyo (JP); Takao Taguchi, Tokyo (JP); Masashi Aimatsu, Tokyo (JP)

(73) Assignee: Toppan Printing Co., Ltd. (JP)

( * ) Notice: Subject to any disclaimer, the term of this patent is extended or adjusted under 35 U.S.C. 154(b) by 0 days.

(21) Appl. No.: 12/704,937

(22) Filed: Feb. 12, 2010

(65) Prior Publication Data

US 2010/0149460 A1     Jun. 17, 2010

Related U.S. Application Data

(63) Continuation of application No. PCT/JP2008/072069, filed on Dec. 4, 2008.

(30) Foreign Application Priority Data

Dec. 11, 2007     (JP)   .............................. 2007-319413

(51) Int. Cl.
*G02F 1/1335*     (2006.01)
(52) U.S. Cl. .................... 349/117; 349/114; 349/106; 349/75

(58) Field of Classification Search ................... 349/75, 349/117, 118, 127, 96, 106, 114; 430/319, 430/20; 428/1.1, 1.2, 1.3; 252/299.01, 299.5
See application file for complete search history.

(56) References Cited

U.S. PATENT DOCUMENTS 7,575,786 B2 *    8/2009    Hayashi et al. .............. 428/1.1

FOREIGN PATENT DOCUMENTS

| JP | 2004-191832 | 7/2004 |
| JP | 2006-085130 | 3/2006 |

* cited by examiner

*Primary Examiner*—Thoi V Duong
(74) *Attorney, Agent, or Firm*—Squire, Sanders & Dempsey L.L.P.

(57) ABSTRACT

A liquid crystal display device may include a first substrate; a second substrate; a first polarizing plate on the first substrate; a second polarizing plate arranged on the second substrate, and so that a direction of an absorption axis of the second polarizing plate being perpendicular to a direction of an absorption axis of the first polarizing plate; a liquid crystal layer arranged between the first substrate and the second substrate; a color filter layer arranged between the liquid crystal layer and the first or the second substrate, the color filter layer having a plurality of pixels of two or more colors. The retardation thin film has in-plane birefringence index satisfying $0.75 \leq \Delta n[fr]/\lambda d[fr] \leq 1.35$ for a region corresponding to a reflection part of a pixel and satisfying $\Delta n[t] < 1.2 \times 10^{-3}$ for a region corresponding to a transmission part of a pixel.

12 Claims, 19 Drawing Sheets

LIQUID CRYSTAL DISPLAY DEVICE AND METHOD FOR MANUFACTURING THE SAME

This application is a continuation of International Application No. PCT/JP2008/072069, filed Dec. 4, 2008, the entire contents of which are incorporated herein by reference.

FIELD OF THE INVENTION

The present invention is related to a color filter substrate and a method for manufacturing the color filter substrate, the color filter substrate used for a liquid crystal display device and other display devices. In particular, the present invention is related to a matrix type color liquid display device used for a planar type image display device etc.

DESCRIPTION OF THE RELATED ART

In recent years, small-footprint and lightweight liquid crystal displays due to thinness and low power consumption are recognized. The use of liquid crystal displays in a mobile device and a TV is recently increasing rapidly. When a color filter is arranged in the panel of a liquid crystal display device, a multi color display is possible. In general, a R, G, B three color display or six color display with the three colors and RBG pixels for reflection is used.

A reflection type or semi-transmissive liquid crystal display device is frequently adopted for a mobile device. A semi-transmissive liquid crystal display device is partially formed with a reflection part. This is because visibility is kept even during the daytime outdoors. In such a case, in order to effectively utilize reflection light, a $\lambda/4$ phase difference film, a $\lambda/2$ phase difference film or the like as a partial component of an absorption type circular polarization plate is incorporated into a liquid crystal display structure.

However, in such a phase difference film, the phase difference is identical in-plane. Therefore, in the case where a liquid crystal display device including the phase difference film is a color type in which the device includes a color filter substrate, the following problem occurs. Appropriate control of the phase difference is difficult due to different wavelength regions of light which pass through display regions of respective color pixels.

For example, in a reflection type or semi-transmissive liquid crystal display device, a circularly polarizing plate is used which includes a phase difference film having in-plane retardation of $\lambda/4$ (about 138 nm) at a wavelength region of green (center wavelength is around 550 nm) and a linearly polarizing plate. In such a case, at a wavelength region of blue (center wavelength is around 450 nm), it is more than $\lambda/4$. In addition, at a wavelength region of red (center wavelength is around 630 nm), it is less than $\lambda/4$. In display pixels of red and blue, perfect circular polarized light can not be obtained.

Further, in a semi-transmissive liquid crystal display device, as mentioned above, in order to display the reflection part, a phase difference film having in-plane retardation of $\lambda/4$ is used. However, this may cause harm the display quality of a transmission part. This problem is inherently caused as follows. First, in-plane retardation of $\lambda/4$ is not necessary for a transmission part. For displaying a reflection part, a phase difference film of $\lambda/4$ is arranged entirely between a substrate and a polarizing plate of a viewing side, for both a transmission part and a reflection part. Further, to compensate for the display of a transmission part, a phase difference film of $\lambda/4$ is also arranged between a substrate and a polarizing plate of a backlight side. That is, in a transmission part, if phase differences of the two phase difference films of $\lambda/4$ are almost identical, display quality is not damaged in principle. However, in fact, phase differences of both phase difference films are not identical due to a limit in manufacturing. Thereby, contrast is lowered.

In order to solve such problems, the following solutions are known. (1) optical compensation is performed by a retardation plate outside of a liquid crystal cell. (2) optical compensation is performed by a retardation layer inside of a liquid crystal cell.

Patent document 4 is an example of the former solution (1). In patent document 4, a retardation plate is arranged separately from a color filter substrate. Thereby, "this retardation plate distributes three different phase difference regions corresponding to pixels of three basic colors for a color display". However, in the method of patent document 4, there is a distance between a color filter substrate and a retardation substrate. Therefore, it is difficult to perform optical compensation for display in an oblique direction.

As an example of the latter solution (2), the following retardation device is disclosed as follows (cf. see patent document 1). The retardation device has phase differences corresponding to display pixels of three colors. The device is manufactured by forming a film of polymerization type liquid crystal material with a film thickness being different or the type of material used being different.

In addition, the following color filter having a phase difference control layer is also proposed. (for example, see patent document 2.) Light translucent patterns of a color filter are formed so that the patterns have a film thickness which changes according to respective colors. A phase difference control layer such as a liquid crystal polymer is formed on the color filter so that total thickness of the color filter and the phase difference control layer is constant. Thereby, the phase difference control layer is provided with a phase difference according to the display pixels of three colors.

Further, the following liquid crystal display device is proposed. (for example, see patent document 3.) Light translucent patterns of a color filter are formed so that a thickness of the patterns differs according to respective colors and a thickness of the patterns differs according to whether the pattern is a transmission part or a reflection part. A phase difference layer such as a liquid crystal polymer is formed on the patterns so that steps of a color filter layer are flattened and alignment directions differ. Thereby, in a liquid crystal display device, a transmission part does not have a phase difference while a reflection part does, and the phase difference is a value ($\lambda/4$) corresponding to respective colors However, the conventional methods are unsuitable methods for easily and sufficiently solving the problem of phase difference.

For example, patent document 1 discloses a method for making a film thickness of a phase difference layer different for each region by forming a film of polymerization type liquid crystal material. The film is then exposed to irradiation such as UV rays wherein an amount of irradiation is changed for each region. Then, the film is developed by an organic solvent. However, in this method, in the case where a non-cured component remains in a thin film, the film thickness which is finally obtained largely depends on the development conditions. Thereby, it is very difficult to stably obtain a desirable film thickness by controlling the amount of irradiation at the time of exposure. In addition, in the case where a pattern is formed using different kinds of polymerization liquid crystal materials by a photolithography method or printing method, the process must be changed for each kind of polymerization liquid crystal material and therefore, manufacturing is difficult.

In patent document 2, a film thickness of a phase difference layer is decided by a film thickness of a color filter layer which is a lower layer of the phase difference layer. Therefore, a film formation process of a phase difference layer becomes slightly easier. However, it becomes subsequently necessary to strictly control a film thickness of a color filter layer. Therefore, design of a color filter is limited or the manufacturing process of a color filter becomes more difficult. In addition, it is not inherently easy to form a film of a phase difference layer on a color filter layer having steps so that total film thickness of a phase difference layer and a color filter layer is kept uniform.

Problems in the case where a color filter has steps and a phase difference layer flattens the steps in patent document 3 are the same as problems in patent document 2. Different methods for aligning a phase difference layer are as follows. In one method, an alignment film in which alignment directions of a transmission part and reflection part are made different by optical alignment processing is formed. In another method, an alignment film in which alignment directions of a transmission part and reflection part are made different by mask rubbing is formed.

[Patent Document 1] JP-A-2004-191832
[Patent Document 2] JP-A-2005-24919
[Patent Document 3] JP-A-2006-85130
[Patent Document 4] JP-B-3687862

SUMMARY OF THE INVENTION

It is an object of the present invention to solve the above problems. The present invention provides a liquid crystal display device having an optical compensation ability which solves a problem of phase difference which occurs when multi-colors are displayed by a color filter. In addition, the present invention provides a method for easily manufacturing the above liquid crystal display device of high quality First aspect of the present invention is a liquid crystal display device, including: a first substrate; a second substrate facing the first substrate; a first polarizing plate arranged on an opposite surface to the second substrate among both sides of the first substrate; a second polarizing plate arranged on an opposite surface to the first substrate among both sides of the second substrate, and arranged so that a direction of an absorption axis of the second polarizing plate being perpendicular to a direction of an absorption axis of the first polarizing plate; a liquid crystal layer sandwiched between the first substrate and the second substrate; a color filter layer arranged between the liquid crystal layer and the first or the second substrate, the color filter layer having a plurality of pixels of two or more colors and each pixel having a reflection part and a transmission part; and a retardation thin film formed from a liquid crystal fixed layer, and arranged between the first substrate and the second substrate, wherein, in the retardation thin film, as for at least one layer among the pixels, birefringence indexes are different due to different degree of alignment of the liquid crystal fixed layer for respective regions corresponding to any one or some of respective colors, the transmission part and the reflection part, and wherein the retardation thin film has in-plane birefringence index satisfying formula (1) for a region corresponding to the reflection part of a pixel and satisfying formula (2) for a region corresponding to the transmission part of a pixel.

$$0.75 \leq \Delta n[fr]/\lambda d[fr] \leq 1.35 \quad (1)$$

(here, $\lambda d[fr]=(d[f1]\times\lambda[f2])/(d[f2]\times\lambda[f1])$)

$$\Delta n[t]<1.2\times10^{-3} \quad (2)$$

In the above formulas (1) and (2), $\Delta n[t]$ is an in-plane birefringence in a region corresponding to an image transmission part; $\Delta n[fr]$ is a ratio of an in-plane birefringence index in a region corresponding to an image reflection part of a color (hereinafter, color 1) to an in-plane birefringence index in a region corresponding to an image reflection part of an arbitrary other color (hereinafter, color 2); $d[f1]$ and $d[f2]$ are respectively thicknesses of retardation layers in regions corresponding to image reflection parts of color 1 and color 2; and $\lambda[f1]$ and $\lambda[f2]$ are respectively center wavelengths of colors of image reflection parts of color 1 and color 2.

Second aspect of the present invention is the liquid crystal display device according to the first aspect, wherein a direction of a phase delay axis of the retardation thin film having the in-plane birefringence is substantially identical in the entire retardation thin film.

Third aspect of the present invention is the liquid crystal display device according to the first aspect, wherein the liquid crystal layer sandwiched between the first substrate and the second substrate is aligned substantially vertical to the first and second substrates when a voltage is not applied.

Forth aspect of the present invention is the liquid crystal display according to the first aspect, wherein the retardation thin film is formed by any one or both of polymerization and cross-linking of a compound including a thermotropic liquid crystal.

Fifth aspect of the present invention is a method for manufacturing the liquid crystal display device according to claim 1, including:

(a) forming a thin film in which a liquid crystal compound is aligned in a predetermined direction, by applying a solution including a compound showing a thermotropic liquid crystal property and capable of being any one or both of polymerized and cross-linked by at least light on the first substrate;

(b) exposing the first substrate to light so that exposure amounts are different for regions of the first substrate corresponding to predetermined patterns of respective colors of the color filter layer;

(c) heating the first substrate to a temperature equal to or greater than an isotropic phase transition temperature of the liquid crystal compound;

(d) exposing entirely the first substrate to light while the first substrate is at a temperature temperature that keeps the liquid crystal compound in an isotropic phase; and (e) making the first substrate face a second substrate in order to arrange the liquid crystal compound between the first and second substrates.

Sixth aspect of the present invention is the method for manufacturing the liquid crystal display device according to the fifth aspect, wherein the thin film formed in process (a) has a film thickness that is uniform over the entire first substrate.

Seventh aspect of the present invention is the method for manufacturing the liquid crystal display device according the fifth aspect, wherein the compound showing the thermotropic liquid crystal property is capable of being any one or both of polymerized and cross-linked by both light and heat on the first substrate, and wherein, instead of process (d), the first substrate is heated to a temperature equal to or greater than the isotropic phase transition temperature of the liquid crystal compound and equal to or greater than a temperature at which the liquid crystal compound becomes any one or both of polymerized and cross-linked.

Eighth aspect of the present invention is the method for manufacturing the liquid crystal display device according the fifth aspect, wherein, instead of process (d), light irradiation is performed for a portion of the first substrate other than a region of the first substrate where light irradiation of maximum exposure amount is performed during process (b), and the light irradiation is performed while the first substrate is at the temperature that keeps the liquid crystal compound in the isotropic phase.

Ninth aspect of the present invention is the method for manufacturing the liquid crystal display device according to the eighth aspect, wherein the light irradiation while the first substrate is at the temperature that keeps the liquid crystal compound in the isotropic phase, is performed such that a sum total of an exposure amount on the portion of the first substrate in claim 8 and an exposure amount on the same portion of the first substrate during process (b) is equal to an exposure amount for the region where light exposure of maximum exposure amount is performed during process (b).

Tenth aspect of the present invention is the method for manufacturing the liquid crystal display device according to the fifth aspect, wherein the color filter layer is formed before process (a).

Eleventh aspect of the present invention is the method for manufacturing the liquid crystal display device according to the fifth aspect, wherein the color filter layer is formed after process (d).

Twelfth aspect of the present invention is the method for manufacturing the liquid crystal display device according to the fifth aspect, wherein processes (a) through (d) are performed for the first substrate and the second substrate, and wherein a TFT layer is formed on the second substrate before the performance of process (a) on the second substrate.

| Description of the Numerals | |
|---|---|
| 1 | a color filter substrate |
| 2 | a glass substrate |
| 3 | a color filter layer |
| 4 | a liquid crystal fixed layer (a retardation thin film) |
| 4a | a region R |
| 4b | a region G |
| 4c | a region B |
| 4d | a region W |

DETAILED DESCRIPTION OF THE INVENTION

A display panel of a liquid crystal display device has a structure in which a liquid crystal material is arranged between two transparent substrates. In the present invention, one of the substrates is a first substrate while the other substrate facing the first substrate is a second substrate. On one surface of two opposing surfaces of these transparent substrates, a black matrix, a color filter, a counter electrode, an alignment film and the like are usually formed. On the other surface of the two surfaces, a TFT (thin film transistor), a pixel electrode, an alignment film and the like can be formed.

Further, polarizing plates are respectively arranged on the outer sides of the transparent substrates. These two polarizing plates are usually arranged such that polarizing axis are perpendicular to each other. (the angle between respective absorption axis is 90°.) In the case where polarizing plates are parallel to each other, a liquid crystal display device within the scope of the present invention can be obtained. However, in this structure, leak light in a black display increases and display quality is lowered. Therefore, this structure is rarely adopted.

As a method for arranging a liquid crystal between two substrates, a dip pouring method and a dipping-injection method are known. In addition, in the present invention, as for structures of a TFT, a pixel electrode, a counter electrode, an alignment film, a polarizing plate or the like, which are described in, for example, JP-B-3874895 can be used.

A planar body with a liquid crystal fixed layer which is a partial structure of a liquid crystal display device of the present invention is explained. The planar body with the liquid crystal fixed layer is a substrate on which a thin film is formed by polymerization and/or cross-link of a solution including a compound or composition showing liquid crystal properties. Such a substrate can be used not only for a color filter substrate and a TFT substrate but also for a phase difference substrate and a phase difference film in which a liquid crystal fixed layer itself is a self-holding type. In addition, glass, plastic, or a film base material and the like can be used as a material for a planar body.

Hereinafter, a following color filter substrate is described as an example. A liquid crystal fixed layer is formed by forming the liquid crystal property compound or composition on a color filter layer which is a display pixel.

Figure 19:
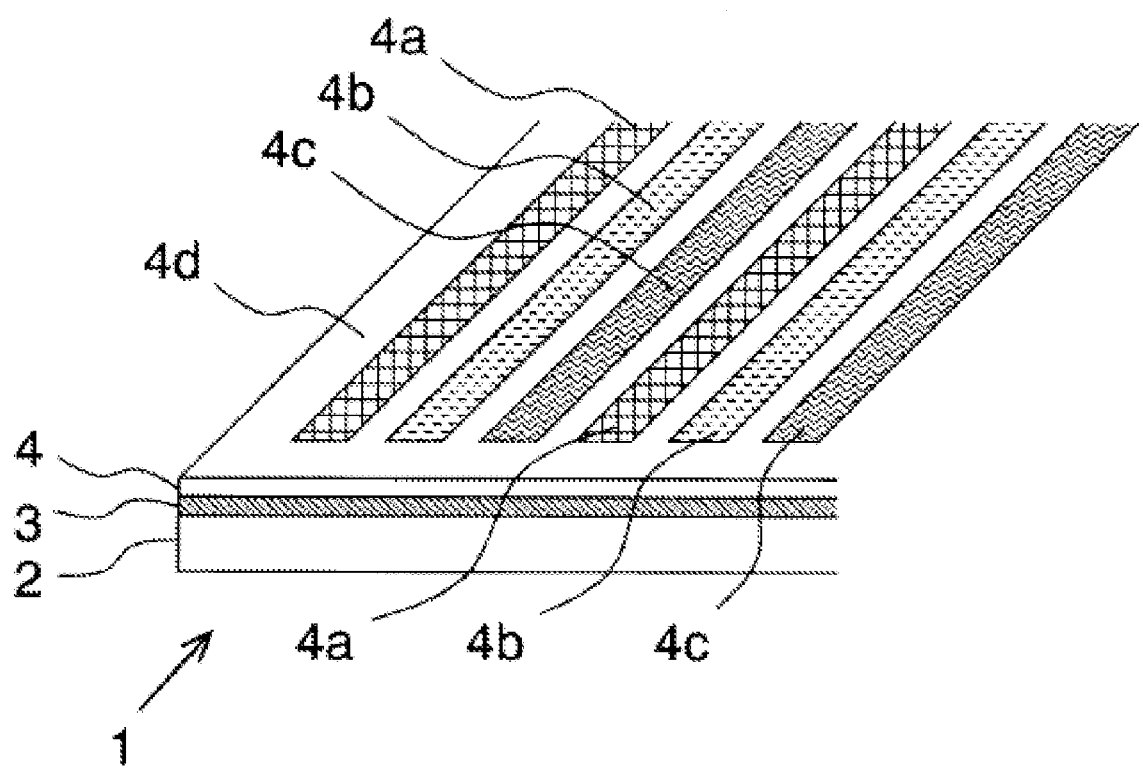
FIG. 19 shows a schematic diagram of one example of a color filter used for a liquid crystal display of the present invention.

FIG. 19 shows one part of a color filter substrate which is a part of a liquid crystal display device of the present invention. The color filter substrate has a structure in which a color filter layer and a liquid crystal fixed layer (a retardation thin film) are formed on a glass substrate. The retardation thin film has a plurality of regions in-plane. Respective regions are polymerized and/or cross-linked and fixed so that degrees of alignment of a liquid crystal compound layer are different from each other. For example, region R (4a) is in a state of almost perfect alignment, and shows the strongest birefringence index property. Region G (4b) is in a state where the degree of alignment thereof is lower than that of region R, and shows a relatively low birefringence index property. Region B (4c) is in a state where the degree of alignment thereof is lower than that of region G, and shows the lowest birefringence index property. As mentioned above, the degree of alignment can be predicted by a change in the birefringence index.

In the case where degrees of alignment of a liquid crystal fixed layer are respectively different, birefringence indexes of respective regions are different. Further, the amounts of phase difference are respectively different values.

In addition, here, a color filter substrate has a structure in which a color filter layer and a liquid crystal fixed layer are formed in order. However, a liquid crystal fixed layer can be formed under a color filter layer or have a structure containing only a color filter layer. In the case where a liquid crystal fixed layer is formed under a color filter layer, the following structures can be adopted: a glass substrate/a liquid crystal fixed layer/a black partition wall/a colored composition layer; and a glass substrate/a black partition wall/a liquid crystal fixed layer/a colored composition layer. In addition, in the case where a structure is a color filter layer without a liquid crystal fixed layer, a counter substrate (usually a TFT substrate) can have a retardation thin film. Further, a plurality of retardation thin films can also be provided. For example, a color filter substrate is provided with a retardation thin film while a counter substrate is provided with a retardation thin film.

In addition, in the present invention, "a degree of alignment" means a respective region state in-plane. The phrase "a degree of alignment" does not always mean a state where the alignment degree is constant in a thickness direction. For example, in a certain region, alignment is almost identical near a lower surface while there is little alignment near an upper surface. In this case, "a degree of alignment" shows an approximate average alignment degree in a thickness direction.

The type of phase difference, that is, the type of alignment of a liquid crystal is not especially limited. Examples are as follows: a positive A plate which is obtained by homogeneous alignment in which a rod-shaped liquid crystal is aligned so as to be horizontal in-plane; a positive C plate which is obtained by homeotropic alignment in which the liquid crystal is perpendicular to a plane; a negative C plate which is obtained by cholesteric alignment in which the liquid crystal is horizontal in-plane and is spiral; a negative A plate which is obtained by homogeneous alignment in which discotic liquid crystal is perpendicular to a plane; and a negative C plate which is obtained by homeotropic alignment in which the liquid crystal is horizontal in-plane. However, embodiments are not limited to these. All existing alignments such as two axis property type (combination of a positive A plate/a negative C plate) in which a rod-shaped liquid crystal is horizontal in-plane and spiral (angle of direction is deflected) can be applied to the present invention.

In a color filter substrate related to the present invention, one region among regions can be optically almost isotropic by fixing a no-alignment state liquid crystal. For example, in the case where a liquid crystal display device is a semi-transmissive type, it is desirable that a retardation thin film is a positive A plate and a region corresponding to a transmission part of a pixel is almost isotropic. The liquid crystal fixed layer region has substantially no phase difference, thereby the region functions as a simple transparent thin film.

In the present invention, a retardation thin film can be comprised of a plurality of layers. As for at least one layer among the retardation thin film, if a region corresponding to a reflection part of a pixel has an in-plane birefringence index satisfying formula (1), and if a region corresponding to a transmission part of a pixel has in-plane birefringence index satisfying formula (2), the above problem of phase difference can be more properly compensated in a semi-transmissive liquid crystal display device having a reflection part and a transmission part in a pixel.

$$0.75 \leq \Delta n[fr]/\lambda d[fr] \leq 1.35 \quad (1)$$

(wherein, $\lambda d[fr]=(d[f1]\times\lambda[f2])/(d[f2]\times\lambda[f1])$.)

$$\Delta n[t] < 1.2 \times 10^{-3} \quad (2)$$

In the formulas, $\Delta n[t]$ is in-plane birefringence in a region corresponding to an image transmission part. $\Delta n[fr]$ is a ratio of in-plane birefringence index in a region corresponding to an image reflection part of a color (hereinafter, color 1) to in-plane birefringence index in a region corresponding to an image reflection part of an arbitrary other color (hereinafter, color 2). $d[f1]$ and $d[f2]$ are respectively thicknesses of retardation layers in regions corresponding to image reflection parts of color 1 and color 2. $\lambda[f1]$ and $\lambda[f2]$ are respectively center wavelengths of colors of image reflection parts of color 1 and color 2.

In a retardation thin film of the present invention, respective regions have different birefringence indexes of a liquid crystal fixed layer. Thereby amounts of phase difference of respective regions are controlled to be desirable values. Therefore, if regions have different amounts of phase difference, it is not necessary for the regions to have different thicknesses. Therefore, it is possible that all of a plurality of regions have almost identical film thickness. That is, it is possible that the entire region of a retardation thin film has an identical film thickness. Needless to say, regions are designed to have different film thicknesses.

A variety of methods for obtaining a color filter substrate related to the present invention can be considered. However, an existing method for manufacturing a color filter can be used.

Hereinafter, as an example, a case is described wherein a pixel is formed by forming films of coloring compositions of respective colors on predetermined regions and curing the films. In the coloring composition, a pigment is dispersed in a pigment carrier.

An organic or inorganic pigment can be used in which the pigment is used alone, or two or more kinds of pigments mixed together may be used as a pigment included in the coloring composition. Pigments having a high coloring property and a high resistance to heat are preferable. Pigments having a high resistance to thermal decomposition are especially preferable. An organic pigment is usually used. Hereinafter, concrete examples of an organic pigment which can be used for a coloring composition are shown by color index numbers.

As a red coloring composition, for example, a red pigment such as C.I. Pigment Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272 and 279 can be used. In addition, for a red coloring composition, a yellow pigment can be used together with the red pigment.

A yellow pigment is, for example, C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 198, 213, 214 and the like.

In addition, as a green coloring composition, a green pigment such as C.I. Pigment Green 7, 10, 36 and 37 can be used, and a yellow pigment can be used together with the green pigment. As a yellow pigment, the above mentioned yellow pigments which are described in the explanation of the red coloring composition can be used.

As a blue coloring composition, a blue pigment such as C.I. Pigment Blue 15, 15:1, 15:2, 15:3, 15:4, 15:6, 16, 22, 60, 64 can be used, and violet pigment can be used together with a blue pigment. Examples of a violet pigment include C.I. Pigment Violet 1, 19, 23, 27, 29, 30, 32, 37, 40, 42 and 50.

In addition, an inorganic pigment can be used. Examples thereof include metallic oxide powder, metallic sulfide powder and metal powder such as yellow lead, zinc yellow, red oxide (red ferric oxide (III), cadmium red, ultramarine blue, iron blue, chromic oxide green and cobalt green. An inorganic pigment is used with an organic pigment so that excellent application properties, sensitivity and developing properties are secured while chromaticity and brightness are balanced.

The coloring composition may contain dye if a sufficient thermal resistance can be achieved. In this case, the dye can be used for color matching.

In addition, a pigment carrier included in the coloring composition is used for dispersing a pigment. A pigment carrier is comprised of a transparent resin such as thermoplastic resin, thermosetting resin, light-sensitive resin, and a precursor thereof, and a mixture thereof. The transparent resin has a transmittance of the entire wavelength region of 400-700 nm of a visible light region which is preferably equal to or more than 80%, and more preferably equal to or more than 95%. Examples of the transparent resin include thermoplastic resin, thermosetting resin and light-sensitive resin. The precursor of the transparent resin is, for example, monomers and/or oligomers that cure when irradiated with rays. A single kind of material can be used, or a mixture including two or more kind of materials can be used as the monomer and oligomer.

In the coloring composition, the transparent resin is used at an amount of, for example, 30 to 700 parts by weight, preferably 60 to 450 parts by weight with respect to 100 parts by weight of the pigment. In the case where a mixture of the transparent resin and the precursor thereof is used as the pigment carrier, the transparent resin is used in the coloring composition at an amount of, for example, 20 to 400 parts by weight, preferably 50 to 250 parts by weight with respect to 100 parts by weight of the pigment. In this case, the precursor of the transparent resin is used in the coloring composition at an amount of, for example, 10 to 300 parts by weight, preferably 10 to 200 parts by weight with respect to 100 parts by weight of the pigment.

Examples of thermoplastic resin include butyral resin, styrene-maleic acid copolymer, chlorinated polyethylene, chlorinated polypropylene, polyvinyl chloride, vinyl chloride-acetic acid vinyl copolymer, polyvinyl acetate, poly urethane type resin, polyester resin, acrylic resin, alkyd resin, polystyrene, polyamide resin, rubber system resin, cyclized rubber system resin, cellulose, polybutadiene, polyethylene, polypropylene and polyimide resin.

In addition, examples of thermosetting resin include epoxy resin, benzoguanamine resin, rosin denaturation maleic resin, rosin denaturation fumaric acid resin, melamine resin, urea resin and phenol resin.

As the photosensitive resin, resins obtained by causing the reaction of an acrylic compound, a methacrylic compound or cinnamic acid having a reactive substituent such as isocyanate group, aldehyde group and epoxy group with a linear polymer having a reactive substituent such as hydroxyl group, carboxyl group and amino group to introduce photo-crosslinking groups such as acryloyl groups, methacryloyl groups and styryl groups into the linear polymer can be used, for example. Alternatively, resins obtained by half-esterifying a linear polymer including acid anhydride such as styrene-maleic anhydride copolymer and α-olefin-maleic anhydride copolymer using acrylic compounds or methacrylic compounds having hydroxyl group such as hydroxyalkyl acrylates and hydroxyalkyl methacrylates may be used.

Examples of an monomer or oligomer which are a precursor of a transparent resin are as follows: various acrylic ester and methacrylic ester such as 2-hydroxy ethyl (meth)acrylate, 2-hydroxy propyl (meth)acrylate, cyclohexyl (meth)acrylate, polyethylene glycol di(meth)acrylate, pentaerythritol tri (meth)acrylate, trimethylolpropane tri (meth)acrylate, dipentaerythritol hexa (meth)acrylate, tricyclodecanyl (meth)acrylate, melamine (meth)acrylate and epoxy (meth) acrylate; (meth) acrylic acid, styrene, vinyl acetate, (meth) acrylic amide, N-hydroxymethyl (meth) acrylic amide and acrylonitrile. A single material can be used, and a combination of these materials can be also used.

In the case where the coloring composition is cured using light such as ultraviolet rays, for example, a photo-polymerization initiator is added to the coloring composition.

Examples of a photoinitiator are as follows: acetophenone system photoinitiator such as 4-phenoxy dichloroacetophenone, 4-t-butyl-dichloroacetophenone, diethoxy acetophenone, 1-(4-isopropyl-phenyl)-2-hydroxy-2-methyl propane-1-one, 1-hydroxycyclohexyl phenyl ketone, 2-methyl-1[4-(methylthio) phenyl]-2-morpholino propane-1-one and 2-benzil-2-dimethyl amino-1-(4-morpholino phenyl)-butane-1-one; benzoin system photoinitiator such as benzoin, benzoin methylic ether, benzoin ethyl ether, benzoin isopropyl ether and benzil dimethyl ketal; benzophenone system photoinitiator such as benzophenone, benzoylbenzoic acid, methyl o-benzoylbenzoate, 4-phenyl benzophenone, hydroxybenzophenone, acrylated benzophenone and 4-benzoyl-4'-methyl diphenyl sulfide; thioxanthone system photoinitiator such as thioxanthone, 2-chlorothioxanthone, 2-methyl thioxanthone, isopropyl thioxanthone and 2,4-diisopropyl thioxanthone; triazine-type photoinitiator such as 2,4,6-trichloro-s-triazin, 2-phenyl-4,6-bis(trichloromethyl)- s-triazin, 2-(p-methoxyphenyl)-4,6-bis(trichloromethyl)-s-triazin, 2-(p-tolyl)-4,6-bis (trichloromethyl)-s-triazin, 2-piperonyl-4,6-bis(trichloromethyl)-s-triazin, 2,4-bis (trichloromethyl)-6-styryl-s-triazin, 2-(naphtho-1-yl)-4,6-bis (trichloromethyl)-s-triazin, 2-(4-methoxy-naphtho-1-yl)-4,6-bis (trichloromethyl)-s-triazin, 2,4-trichloromethyl-(piperonyl)-6-triazin, 2,4-trichloromethyl (4'-methoxy styryl)-6-triazin; borate system photoinitiator; carbazole series photoinitiator; and imidazole system photoinitiator.

The photo-polymerization initiator is used in the coloring composition at an amount of, for example, 5 to 200 parts by mass, preferably 10 to 150 parts by mass with respect to 100 parts by mass of the pigment.

A single material can be used, or a mixture including two or more materials can be used as the photo-polymerization initiator. A sensitizer may be used together with the photo-polymerization initiator. A compound such as α-acyloxy ester, acylphosphine oxide, methylphenyl glyoxylate, benzil, 9,10-phenanthrenequinone, camphor quinone, ethyl anthraquinone, 4,4'-diethyl isophthaloquinone, 3,3',4,4'-tetra (t-butylperoxycarbonyl)benzophenone and 4,4'-diehylamino benzophenone can be used as the sensitizer.

The sensitizer is used at an amount of, for example, 0.1 to 60 parts by weight with respect to 100 parts by weight of the photo-polymerization initiator.

The coloring composition may further contain a chain transfer agent such as multi-functional thiol.

Any polyfunctional thiol can be used as long as polyfunctional thiol is a compound having two or more thiol groups. For example, hexane dithiol, decane dithiol, 1,4-butanediol bis thiopropionate, 1,4-butanediol bis thioglycolate, ethylene glycol bis thioglycolate, ethylene glycol bis thio propionate, trimethylolpropane tris thioglycolate, trimethylolpropane tris thio propionate, trimethylolpropane tris (3-mercapto butyrate), pentaerythritol tetrakis thioglycolate, pentaerythritol tetrakis thio propionate, tri mercaptopropionate tris (2-hydroxy ethyl) isocyanurate, 1,4-dimethyl mercapto benzene, 2,4,6-tri mercapto-s-triazin, 2-(N,N-dibutyl amino)-4,6-dimercapto-s-triazin are used. One kind of polyfunctional thiol can be used alone, and two or more kinds mixed can also be used.

The multi-functional thiol is used in the coloring composition at an amount of, for example, 0.2 to 150 parts by weight, preferably 0.2 to 100 parts by weight with respect to 100 parts by weight of the pigment.

The coloring composition may further contain a solvent. When the solvent is used, the dispersibility of the pigment increases. As a result, the coloring composition can be easily applied to a planar body such as a glass substrate at a dried thickness of, for example, 0.2 to 5 μm in order to form display pixels of respective colors. Cyclohexanone, ethyl cellosolve acetate, butyl cellosolve acetate, 1-methoxy-2-propyl acetate, diethylene glycol dimethoxy ether, ethyl benzene, ethylene glycol diethyl ether, xylene, ethyl cellosolve, methyl-n amyl ketone, propylene glycol monomethyl ether, toluene, methyl ethyl ketone, ethyl acetate, methanol, ethanol, isopropyl alcohol, butanol, isobutyl ketone, petroleum solvent, or a mixture containing two or more of these can be used as the solvent, for example.

The solvent is used in the coloring composition at an amount of, for example, 800 to 4,000 parts by weight, preferably 1,000 to 2,500 parts by weight with respect to 100 parts by weight of the pigment.

The coloring composition can be manufactured, for example, by finely dispersing one or more pigments into the pigment carrier and the organic solvent together with the above-described photo-polymerization initiator as needed using a dispersing device such as three-roll mill, two-roll mill, sand mill, kneader and attritor. A coloring composition containing two or more pigments may be manufactured by preparing dispersions containing different pigments and mixing the dispersions together. When dispersing the pigment into the pigment carrier and the solvent, a dispersion aid such as resin-type pigment-dispersion aid, surfactant and pigment derivative may be used. The dispersion aid increases the dispersibility of the pigment and suppresses the reaggregation of the dispersed pigment. Therefore, in the case of using a coloring composition prepared by dispersing a pigment into a pigment carrier and a solvent using a dispersion aid, a color filter excellent in transparency can be obtained.

0.1-40 parts by weight of dispersion aid for 100 parts by weight of pigment included in a coloring composition can be preferably used. 0.1-30 parts by weight of dispersion aid is more preferably used.

The resin-type pigment-dispersing agent includes a pigment-affinitive moiety having a property whereby the pigment absorbs and a moiety having a compatibility with the pigment carrier. The resin-type pigment-dispersing agent is adsorbed by the pigment so as to stabilize the dispersibility of the pigment in the pigment carrier. An oil-based dispersing agent such as polyurethane, polycarboxylate, e.g. polyacrylate, unsaturated polyamide, polycarboxylic acid, partial amine salt of polycarboxylic acid, ammonium polycarboxylate, alkylamine polycarboxylate, polysiloxane, long-chain polyaminoamide phosphate and hydroxyl group-containing polycarboxylate, modified compounds thereof, amide produced through a reaction of poly(lower alkylene imine) with polyester having a free carboxyl group and a salt thereof; water-soluble resin or water-soluble macromolecular compound such as acrylic acid-styrene copolymer, methacrylic acid-styrene copolymer, acrylic acid-acrylate copolymer, acrylic acid-methacrylate copolymer, methacrylic acid-acrylate copolymer, methacrylic acid-methacrylate copolymer, styrene-maleic acid copolymer, polyvinyl alcohol and polyvinyl pyrrolidone; polyester; modified polyacrylate; ethylene oxide/propylene oxide adduct; phosphate; or a compound containing two or more of these can be used as the resin-type pigment-dispersing agent, for example.

Examples of a surface active agent are as follows: anionic surfactants such as polyoxyethylene alkyl ether sulfate, sodium dodecylbenzenesulfonate, alkali salt of styrene-acrylic acid copolymer, alkyl naphthalene sodium sulphonate, alkyl diphenyl ether sodium disulphonate, lauryl sulfuric acid monoethanol-amine, lauryl sulfuric acid triethanolamine, lauryl ammonium sulfate, stearic acid monoethanol-amine, sodium stearate, dodecyl sodium sulfate, monoethanol-amine of styrene-acrylic acid copolymer and polyoxyethylene alkyl ether phosphate ester; nonionic surface active agents such as polyoxyethylene oleyl ether, polyoxyethylene lauryl ether, polyoxyethylene nonyl phenyl ether, polyoxyethylene alkyl ether phosphate ester, polyoxyethylene sorbitan monostearate and polyethylene glycol monolaurate; cationic surfactants such as the fourth grade alkyl ammonium salt or ethylene oxide adduct thereto; and ampholytic surface active agents such as alkyl betaine such as alkyl dimethylamino acetic acid betaine and alkyl imidazoline. The above material can be used alone, and the above materials can be also used in combination.

The dye derivative is a compound produced by introducing a substituent into an organic dye. Although the dye derivative is similar in hue to the pigment used, the hue of the former may be different from that of the latter if the loading thereof is small. Note that the term "organic dye" includes aromatic polycyclic compounds exhibiting a light yellow color such as naphthalene-based compounds and anthraquinone-based compounds, which are generally not referred to as "dye". As the dye derivative, those described in JP-A 63-305173, JP-B 57-15620, JP-B 59-40172, JP-B 63-17102 or JP-B 5-9469 can be used. Especially, the dye derivatives having a basic group are highly effective in the dispersion of a pigment. The coloring composition may contain a single dye derivative or a plurality of dye derivatives.

A storage-stability improver may be added to the coloring composition in order to improve the temporal stability of its viscosity. Benzyltrimethyl chloride; quaternary ammonium chloride such as diethylhydroxy amine; organic acid such as lactic acid and oxalic acid; methyl ether of the organic acid; t-butyl pyrocatechol; organic phosphine such as tetraethyl phosphine and tetraphenyl phosphine; and phosphate can be used as the storage-stability improver.

The storage-stability improver is contained in the coloring composition at an amount of 0.1 to 10 parts by weight with respect to 100 parts by weight of the pigment.

In addition, an adhesion improver such as silane coupling agents can be included in a coloring composition to raise adhesion properties with a substrate.

Examples of a silane coupling agent are as follows: vinylsilane such as vinyl tris (β-methoxyethoxy) silane, vinyl ethoxy silane and vinyl trimethoxysilane; methacryl silane such as γ-methacryloxypropyl trimethoxysilane; epoxysilane such as β-(3,4-epoxy cyclohexyl)ethyl trimethoxysilane, β-(3,4-epoxy cyclohexyl) methyl trimethoxysilane, β-(3,4-epoxy cyclohexyl)ethyltriethoxysilane, β-(3,4-epoxy cyclohexyl) methyltriethoxysilane, γ-glycidoxypropyltrimethoxysilane and γ-glycidoxypropyl triethoxysilane; aminosilane such as N-β(aminoethyl) γ-aminopropyltrimethoxysilane, N-β(aminoethyl) γ-aminopropyl triethoxysilane, N-β(aminoethyl) γ-aminopropyl methyl diethoxy silane, γ-aminopropyl triethoxysilane, γ-aminopropyltrimethoxysilane, N-phenyl-γ-aminopropyltrimethoxysilane and N-phenyl-γ-aminopropyl triethoxysilane; and thiosilane such as γ-mercapto propyl trimethoxysilane and γ-mercapto propyl triethoxysilane.

The silane coupling agent is contained in the coloring composition at an amount of 0.01 to 100 parts by weight with respect to 100 parts by weight of the pigment.

The coloring composition can be prepared in the form of a gravure offset printing ink, a waterless offset printing ink, a silk screen printing ink, or a solvent developer-type or alkaline developer-type colored resist. The colored resist is obtained by dispersing dye in a composition containing a thermoplastic resin, thermosetting resin or photosensitive resin, a monomer, a photo-polymerization initiator and an organic solvent.

The pigment is used at an amount of 5 to 70 parts by weight, preferably 20 to 50 parts by weight with respect to 100 parts by weight of the total solid contents in the coloring composition. Note that most of the remainder of the solid contents in the coloring layer is the resin binder included in the pigment carrier.

Prior to using the coloring composition for forming a film, particles having a size of 5 µm or more, preferably 1 µm or more, more preferably 0.5 µm or more may be removed from the coloring composition using a refiner such as a centrifugal separator, sintered filter and membrane filter. Large particles or contaminants are preferably removed.

A color filter related to the present invention has display pixels of a plurality of colors on a planar body, the display pixels formed by a printing method or a photolithography method.

Glass plates such as soda-lime glass, low alkali borosilicate glass and no alkali alumino borosilicate glass, and resin plates such as polycarbonate, polymethyl methacrylate and polyethylene terephthalate are used as the planar body. In addition, a transparent electrode made of indium oxide, tin oxide and the like may be formed on a surface of the planer body for driving a liquid crystal after liquid crystal panellization. Further, in addition, a solidification liquid crystal layer may be formed earlier on a plane body, Forming display pixels of respective colors by a printing method is as follows. A pattern can be formed just by repeating both printing and drying a coloring composition which is prepared as the above stated various printing inks. Therefore, a printing method is superior because of low cost and mass production as a method of manufacturing a color filter. Further, a fine pattern having highly accurate dimensions and a high degree of smoothness can be formed by printing according to the development of printing technology. In order to perform printing, the following composition of an ink is preferable. An ink is not dried and solidified on a printing plate or a blanket. In addition, it is important to control the fluidity of an ink on a printing machine. Therefore, adjustment of viscosity of an ink by a dispersing agent or extender pigment can be performed.

Forming display pixels of respective color by a photolithography is as follows. A coloring composition is prepared as a colored resist of solvent development type or alkaline development type. The coloring composition is applied to a planar body by an application method such as a spray coat, a slit coat and a roll coat so that a film thickness of the dried composition is 0.2-10 µm. In the case where the applied film is dried, a reduced-pressure drying machine, a convection oven, an IR oven, a hot plate and the like can be used.

If necessary, the dried film is exposed to a LTV ray through a mask having a predetermined pattern wherein the mask is in contact with the film or is not in contact with the film. Thereafter, the non-cured part is removed by dipping the film in a solvent or alkaline developer or by spraying a development liquid onto the film. Thereby, a desirable pattern is formed. Thereafter, the same processes are repeated for forming other color films to obtain a color filter. Further, in order to promote polymerization of a colored resist, heating can be performed if necessary. If a photolithography method is used, a color filter having a higher definition can be obtained compared with the printing method.

In developing, for example, an aqueous solution of sodium carbonate or sodium hydroxide can be used as the alkaline developer. Alternatively, a liquid containing an organic alkali such as dimethylbenzyl amine and triethanol amine may be used as the alkaline developer. An additive such as defoaming agent or surfactant may be added to the developer. A shower developing method, a spray developing method, a dip developing method or a paddle developing method may be utilized for developing.

In order to enhance the sensitivity to light (UV ray) exposure, the following process may be further performed. That is, after drying the first coated film of the colored resist, an alkaline-soluble resin, for example, polyvinyl alcohol or water-soluble acrylic resin is applied to the first coated film. After drying the second coated film, UV ray exposure is performed. The second coated film prevents the polymerization in the first coated film from being inhibited by oxygen. Therefore, a higher sensitivity to light (UV ray) exposure can be achieved.

A color filter layer in a color filter related to the present invention can be formed by the following method in addition to the above method: ink-jet method; electrodeposition method; and transfer method. In addition, the ink-jet method is as follows. Inks of respective colors are ejected and dropped on a region sectioned by a light-shielding partition wall formed on a planar body to form a display pixel. An electrodeposition method is as follows. By using a transparent conductive film formed on a planar body, display pixels of respective colors are formed on the transparent conductive film by electrodeposition using electrophoresis of colloid particle. In addition, a transfer method is as follows. A color filter layer is formed beforehand on a surface of a transfer base sheet having peeling properties. This color filter is transferred to a desirable planar body.

Next, a method for preparing a liquid crystal fixed layer used for the present invention is described.

First of all, a liquid crystal material layer is formed on a planar body, the liquid crystal material layer including a photopolymerization property or photocrosslinking property thermotropic liquid crystal material. For example, the following liquid crystal material layer is formed. In a liquid crystal material layer, mesogen is aligned in one direction parallel to a main surface of a substrate. Then, this liquid crystal material layer is subjected to pattern-exposure and thermal-processing to obtain a liquid crystal fixed layer.

The liquid crystal material layer can be obtained, for example, by applying a coating solution containing a thermotropic liquid crystal compound on a planar body and drying the coated film, if necessary. In the liquid crystal material layer, the mesogens of the thermotropic liquid crystal compound form an alignment structure.

In addition to the thermotropic liquid crystal compound, components such as solvent, chiral agent, photo-polymerization initiator, thermal polymerization initiator, sensitizer, chain transfer agent, multi-functional monomer and/or oligomer, resin, surfactant, storage-stability improver and adhesion improver can be added to the coating solution to the extent that the composition containing the liquid crystal compound does not lose mesomorphism.

Examples of the thermotropic liquid crystal are as follows: alkylcyanobiphenyl, alkoxybiphenyl, alkyl terphenyl, phenylcyclohexane, biphenylcyclohexane, phenyl bicyclohexane, pyrimidine, cyclohexane carboxylate, halogenation cyanophenol ester, alkyl benzoate, alkyl cyano tolane, dialkoxy tolane, alkyl alkoxy tolane, alkylcyclohexyl tolane, alkyl bicyclohexane, cyclohexyl phenylethylene, alkylcyclohexyl cyclohexene, alkyl benzaldehyde azine, alkenyl benzaldehyde azine, phenylnaphthalene, phenyl tetrahydronaphthalene, phenyl decahydronaphthalene, triphenylene, penta ethynylbenzene, derivative thereof and acrylate of the compound.

The same materials as that exemplified for the coloring composition can be used as photo-polymerization initiator, sensitizer, chain transfer agent, multi-functional monomer or oligomer, resin, surfactant, storage-stability improver and adhesion improver.

Also, the same materials as that exemplified for the coloring composition can be used as the solvent.

Next, this solution is applied to a planar body. In this case, if necessary, a surface of the planar body is as follows: a surface of the planar body has an alignment film beforehand; and a surface of the planar body is subjected to a process so that the surface itself has an ability to control alignment. For example, this alignment film is obtained as follows. A transparent resin layer such as polyimide is formed on a substrate. Thereafter this layer is subjected to alignment processing such as rubbing. This alignment film is also obtained by using photo-alignment technology.

For applying the coating solution, a printing method such as spin coating, slit coating, relief printing, screen printing, planographic printing, reverse printing and gravure printing; the printing method incorporated into an offset system; an inkjet method; or bar coat method can be used, for example. An existing film formation method can also be used.

Here, as a planar body, an example of a substrate with a color filter is described. However, the kind of a planar body is not especially limited. For example, as a planar body, in addition to a color filter substrate, the following light translucent substrates can be preferably used: a glass plate, a resin plate or TFT substrate with a driving device formed on the plate. In addition to these, a light translucent film such as a plastic film can be used as a planar body.

Next, a first exposure process is performed. That is, a plurality of regions of a liquid crystal layer is irradiated with light so that irradiation is performed in different exposure conditions. Different exposure conditions means that exposure time, lighting intensity, emission line and the like, and combination thereof are different. In the first exposure process, irradiation energies (amounts of exposure) are usually different for respective regions. However, some materials have a "reciprocity failure" property. In such a case, the amounts of exposure are not necessary to be different. For example, one region is exposed in a condition of high lighting intensity for a short time while another region is exposed in a condition of low lighting intensity for a long time. As a result, the amounts of exposure (lighting intensity×exposure time) for both regions can be the same.

Hereinafter, a case where the amounts of exposure are different for respective regions is described.

For example, a region corresponding to a reflection part of a red pixel in a liquid crystal material layer is exposed in which the amount of exposure is maximum. A region corresponding to a reflection part of a green pixel in a liquid crystal material layer is exposed in which the amount of exposure is lower than that in the case of the reflection part of the red pixel. A region corresponding to a reflection part of a blue pixel in a liquid crystal material layer is exposed in which the amount of exposure is lower than that in the case of the reflection part of a green pixel. Then, for example, a region corresponding to a transmission part of a pixel in a liquid crystal material layer is not exposed. Thereby, in a part of a liquid crystal material layer, the part being exposed, thermotropic liquid crystal compound is polymerized or cross-linked while an alignment structure formed by mesogen is maintained.

In a product formed by polymerization or cross-link of thermotropoic liquid crystal compound, its mesogenic group is fixed. In the region of the maximum amount of exposure, the content of a product formed by polymerization or cross-link of thermotropoic liquid crystal compound is highest while the content of thermotropoic liquid crystal compound of non-polymerization or non-cross-link is lowest. Further, if the amount of exposure becomes low, the content of a product formed by polymerization or cross-link of thermotropoic liquid crystal compound becomes low while the content of thermotropoic liquid crystal compound of non-polymerization or non-cross-link become high.

Therefore, a ratio of a fixed mesogenic group is high in a region where the amount of exposure is high while a ratio of a fixed mesogenic group is low in a region where the amount of exposure is low. Further, in a region where the amount of exposure is zero, a mesogenic group is not fixed.

Rays such as UV ray, electron ray, visible light ray and infrared ray can be used in exposure. In the present invention, "light" means one kind of or plurality of kinds of rays among the above stated rays. Phrases such as "polymerization by light" and "light polymerization property" mean characteristics related to one kind of or plurality of kinds of rays among the above stated rays.

A first exposure process can be performed by any method if non-uniform polymerization or cross-link occurs. For example, in this exposure process, exposure using a photo mask can be performed several times. Usually, the length of irradiation time is different for each of the plurality of exposures. Instead of this or in addition to this, different light sources can be used for each exposure. Alternatively, in this exposure process, exposure using a halftone mask, a gray tone mask or a mask limiting wavelength can be performed. Instead of using a photo mask, a liquid crystal material layer can be scanned by ray or ray bundle such as electron ray. Alternatively, a combination thereof can be used.

After a first exposure process is finished, a first heating process is performed. That is, a liquid crystal material layer is heated to a temperature equal to a phase transition temperature in which a liquid crystal phase changes to an isotropic phase, or more. A mesogen of thermotropic liquid crystal compound which is an unreacted compound is not fixed. Therefore, if a liquid crystal material layer is heated to a temperature equal to a phase transition temperature or more, a degree of alignment of mesogen of an unreacted compound is lowered. For example, mesogen of an unreacted compound changes from a liquid crystal phase to an isotropic phase. On the other hand, in a product of polymerized or cross-linked thermotropic liquid crystal compound, mesogen is fixed.

Therefore, the degree of alignment of mesogen in a region where the exposure amount in a first exposure process is lower is lower than that in a region where the exposure amount in a first exposure process is higher. Further, in a region where exposure is not performed in a first exposure process, an alignment structure of mesogen disappears by this heating process.

Thereafter, while the degree of alignment of mesogen of an unreacted compound is low, the unreacted compound is polymerized and/or cross-linked.

For example, a second exposure process is performed. The second process is explained below. That is, while a liquid crystal material layer is kept at a temperature more than a phase transition temperature in which a thermotropic liquid crystal compound changes from a liquid crystal phase to an isotropic phase, the entire liquid crystal material layer is irradiated by light. A liquid crystal material layer is irradiated by light of a sufficient amount so that almost all of an unreacted compound is polymerized and/or cross-linked. In this process, an unreacted compound is polymerized or cross-linked, and mesogen of which the degree of alignment is lowered is fixed. In this way, a liquid crystal fixed layer is obtained.

In addition, in certain liquid crystal compounds, a first phase transition temperature in which an isotropic phase changes to a liquid crystal phase is lower than a second phase transition temperature in which a liquid crystal phase changes to an isotropic phase. Therefore, in a specific case, a temperature of a liquid crystal material layer in a second exposure process can be lower than a heating temperature in a first heating process. However, usually, in view of ease, a temperature of a liquid crystal material layer in a second exposure process is equal to or more than a first phase transition temperature.

Rays (light) which can be used in a first exposure process can also be used in a second exposure process. Rays used in a second exposure process and rays used in a first exposure process can be identical or different.

In a second exposure process, the amount of exposure is uniform over the entire liquid crystal material layer. In this case, it is not necessary to use a photo mask with a fine pattern. Therefore, in this case, processes can be simplified.

Alternatively, a second exposure process can be performed so that the total exposure amount including the exposure amount in a first exposure process and exposure amount in a second exposure process is identical over all regions. For example, in the case where total exposure amount in one region is much more than total exposure amount in another region, the following problem may occur. If the latter amount is sufficiently large, the one region may be subjected to undesirable damage, or a color filter layer near this region may be subjected to undesirable damage. If the total exposure amount is identical over all regions, such damage can be prevented.

Polymerization and/or cross-link of an unreacted compound can be performed by other methods.

For example, in the case where a reacted compound is a material which is polymerized and/or cross-linked by heating to a polymerization and/or cross-link temperature more than a second phase transition temperature, a second heating process can be performed instead of a second exposure process. Specifically, instead of a second exposure process, a liquid crystal material layer is heated to a polymerization and/or cross-link temperature or more, thereby an unreacted compound is polymerized and/or cross-linked. In this way, a liquid crystal fixed layer is obtained. In addition, for example, a heating temperature in a first heating process is equal to or more than a first phase transition temperature and is less than a polymerization and/or cross-link temperature.

In addition, a first heating process and a second heating process can be performed together. For example, a substrate is heated from room temperature to a polymerization and/or cross-link temperature. In this case, at a certain point, a temperature becomes less than a polymerization and/or cross-link temperature and more than a second phase transition temperature. At this point, transition from a liquid crystal phase to an isotropic phase is relatively quick. Therefore, it is not necessary to maintain a substrate for a long time at this temperature. That is, in a process where a substrate is continuously heated from room temperature to a polymerization and/or cross-link temperature, in a liquid crystal material layer, at first, alignment of mesogen is lowered, thereafter polymerization and/or cross-link by heating progresses. In this case, a temperature increase process in a second heating process corresponds to a first heating process.

In addition, further, a heating temperature in a first heating process can be a polymerization and/or cross-link temperature or more. However, in this case, both a decrease in the degree of alignment and polymerization and/or cross-link progress simultaneously. Therefore, the influence of manufacturing conditions on an optical property of a liquid crystal fixed layer is relatively large.

Alternatively, after a first heating process, a second heating process and a second exposure process can be performed in this order. Alternatively, after a first heating process, a second exposure process and a second heating process can be performed in this order. Alternatively, after a first heating process, a second heating process, a second exposure process and a second heating process can be performed in this order. If a second exposure process and a second heating process are combined as in this case, polymerization and/or cross-link of an unreacted compound can progress with certainty. Therefore, a robust liquid crystal fixed layer can be obtained.

In the case where a development process is performed after a first exposure process, a liquid crystal fixed layer can be obtained, the layer having a plurality of regions, the regions being identical in refractive index anisotropy and having different film thicknesses. Since these regions have different film thicknesses, retardations thereof are different.

However, it is difficult to strictly control a wet process, and in particular it is difficult to control the development conditions. The influence of the conditions on an optical property of a final product is significantly large. Therefore, if a method including a wet process is adopted, a target value of an optical property is not easily achieved.

On the other hand, in the above mentioned method, a wet process is not performed on and after a first exposure process. Therefore, this method can prevent refractive index anisotropy from being misaligned with a target value because a wet process causes the anisotropy to be misaligned with a target value.

In addition, there is not always a proportional relationship between a refractive index anisotropy and the amount of exposure in a first exposure process. However, in conditions where a material and an amount of exposure are respectively identical, repeatability of a refractive index anisotropy is high. Therefore, it is easy to find the necessary conditions for achieving a certain refractive index anisotropy, for example, the amount of exposure. In addition, stable manufacturing is easily performed.

Effects of the Invention

According to the first aspect of the present invention, the following effect is achieved. A liquid crystal fixed layer is arranged between a first substrate and a second substrate. This is different from the conventional structure in which a phase difference film is additionally arranged on the exterior of the two substrates. Thereby, in claim 1, phase difference can be provided being suitable for pixel colors and respective regions of a reflection part/transmission part without the influence of parallax. Further, the phase differences are respectively provided by differences in a birefringence index. Thereby, a thin film of one layer formed on the entire surface of a substrate as a single body can solve a problem of phase difference.

In addition, according to the first aspect of the present invention, in the above, birefringence index value can be controlled to be more strict and optimal value. Thereby, a problem due to phase difference can be solved.

According to the second aspect of the present invention, even if a direction of a slow axis is identical in a liquid crystal fixed layer, birefringence indexes are different due to the difference in degree of alignment of respective colors. Therefore, in the case where a liquid crystal compound is aligned by a simple method such as rubbing an alignment film in a constant direction, optimal phase difference compensation for respective colors becomes possible. Thereby, the above problem of phase difference can be solved.

According to the third aspect of the present invention, a VA or MVA driving type liquid crystal display device can be provided, the device providing a black display in which leak light is controlled particularly when a voltage is not applied.

According to the forth aspect of the present invention, thermotropic liquid crystal is used for a liquid crystal fixed layer. Therefore, a liquid crystal display device using a color filter substrate can be manufactured by a heating process wherein the color filter substrate has the above anisotropy different for respective colors.

According to the fifth aspect of the present invention, a liquid crystal compound layer can be precisely formed with certainty, the layer having phase difference which differs for respective colors. Thereby, a liquid crystal display device having good display characteristics can be obtained.

According to the sixth aspect of the present invention, by making a film thickness uniform, processes can be easily performed.

According to the seventh aspect of the present invention, a liquid crystal fixed layer can be precisely and easily formed, the layer having different refractive index anisotropy for respective color regions.

According to the eighth aspect of the present invention, an undesirable reaction can be controlled by preventing a region of too much exposure amount, the reaction occurring due to too much exposure.

According to the ninth aspect of the present invention, an undesirable reaction can be more surely controlled by setting total exposure amount for respective color regions uniform, the reaction occurring due to too much exposure.

According to the tenth aspect of the present invention, phase difference due to a color filter layer can be surely removed, because a liquid crystal fixed layer is formed after a color filter layer is formed on a substrate.

According to the eleventh aspect of the present invention, alignment control of a liquid crystal compound can be surely performed on a substrate, because a color filter layer is formed after a liquid crystal fixed layer is formed on a substrate.

According to the twelfth aspect of the present invention, because a liquid crystal fixed layer is formed on a TFT layer, alignment control of a liquid crystal compound can be surely performed in a state where a lower layer step is smaller than that in the case where a liquid crystal fixed layer is formed on a color filter layer. Therefore, a liquid crystal fixed layer can be formed while influence of heat of a post-process is prevented, compared with the case of formation under a color filter layer.

EXAMPLES

Hereinafter, embodiments of the present invention are described by specific examples. However, the present invention is not limited to these examples. In addition, materials used in the present invention are very sensitive to light. Therefore, it is necessary to prevent the materials from irradiation by unnecessary light such as natural light. Therefore, needless to say, each process is performed under yellow light or red light. In addition, in Examples and Comparative Examples, "part" means "part by weight".

Firstly, the following is described: preparing alkaline developing type coloring composition used for forming a color filter layer in the example; preparing acrylic resin solution/pigment dispersion solution used thereby; and preparing a salt-milling treated pigment which is the raw material of a pigment dispersion solution.

(Preparing an Acrylic Resin Solution 1)

370 parts of cyclohexanone was put into a reaction container and heated to 80° C. while nitrogen gas was injected into the container, and a mixture of the following monomers and thermal polymerization initiator was dropped into the container for one hour at the same temperature. Thereby, a polymerization reaction was performed.

| | |
|---|---|
| methacrylic acid | 20.0 parts |
| methyl methacrylate | 10.0 parts |
| n-butylmethacrylate | 55.0 parts |

| | |
|---|---|
| 2-hydroxy ethyl methacrylate | 15.0 parts |
| 2,2'-azobisisobutyronitrile | 4.0 parts |

After dropping, the reaction was continued at 80° C. for an additional 3 hours. Thereafter, a solution prepared by dissolving 1.0 part by weight of azobisisobutyronitrile in 50 parts by weight of cyclohexanone was added to the liquid in the vessel, and the reaction was continued at 80° C. for an additional 1 hour to obtain a solution of acrylic resin. The weight-average molecular weight of the acrylic resin was about 40,000.

After cooling to an ambient temperature, about 2 g of the above resin solution was taken as a sample. The sample was dried by heating at 180° C. for 20 minutes and a mass of nonvolatile matter was measured. Based on the results of the measurement, cyclohexanone was added to the above resin solution such that the concentration of the nonvolatile matter was 20% by weight. Thus, an acrylic resin solution 1 was prepared.

(Preparing an Acrylic Resin Solution 2)

370 parts of cyclohexanone was put into a reaction container, and heated to 80° C. while nitrogen gas was injected into the container, and a mixture of the following monomers and thermal polymerization initiator was dropped into the container for one hour at the same temperature. Thereby, a polymerization reaction was performed.

| | |
|---|---|
| methacrylic acid | 20.0 parts |
| methyl methacrylate | 10.0 parts |
| n-butylmethacrylate | 35.0 parts |
| 2-hydroxy ethyl methacrylate | 15.0 parts |
| 2,2'-azobisisobutyronitrile | 4.0 parts |
| p-cumylphenol ethylene oxide-modified acrylate | 20.0 parts |

("Aronix M110", a product of TOAGOSEI CO., LTD.)

After dropping, the reaction was continued at 80° C. for an additional 3 hours. Thereafter, a solution prepared by dissolving 1.0 part by weight of azobisisobutyronitrile in 50 parts by weight of cyclohexanone was added to the liquid in the vessel, and the reaction was continued at 80° C. for an additional 1 hour to obtain a solution of acrylic resin. The weight-average molecular weight of the acrylic resin was about 40,000.

After cooling to an ambient temperature, about 2 g of the above resin solution was taken as a sample. The sample was dried by heating at 180° C. for 20 minutes and a mass of nonvolatile matter was measured. Based on the results of the measurement, cyclohexanone was added to the above resin solution such that the concentration of the nonvolatile matter was 20% by weight. Thus, an acrylic resin solution 2 was prepared.

(Preparing Acrylic Resin Solution 3)

560 parts of cyclohexanone was put into a reaction container, and heated to 80° C. while nitrogen gas was injected into the container, and a mixture of the following monomers and thermal polymerization initiator was dropped into the container for one hour at the same temperature. Thereby, a polymerization reaction was performed.

| | |
|---|---|
| methacrylic acid | 34.0 parts |
| methyl methacrylate | 23.0 parts |
| n-butylmethacrylate | 45.0 parts |
| 2-hydroxy ethyl methacrylate | 70.5 parts |
| 2,2'-azobisisobutyronitrile | 8.0 parts |

After dropping, the reaction was continued at 100° C. for an additional 3 hours. Thereafter, a solution prepared by dissolving 1.0 part by weight of azobisisobutyronitrile in 55 parts by weight of cyclohexanone was added to the liquid in the vessel, and the reaction was continued at 80° C. for an additional 1 hour to obtain a solution of copolymer.

Next, the following mixture of compounds was dropped into 338 parts by weight of the copolymer solution thus obtained at 70° C. for 3 hours.

| | |
|---|---|
| 2-methacryloylethyl isocyanate | 32.0 parts |
| lauric acid dibutyl tin | 0.4 parts |
| cyclohexanone | 120.0 parts |

After cooling to an ambient temperature, about 2 g of the above resin solution was taken as a sample. The sample was dried by heating at 180° C. for 20 minutes and a mass of nonvolatile matter was measured. Based on the results of the measurement, cyclohexanone was added to the above resin solution such that the concentration of the nonvolatile matter was 20% by weight. Thus, an acrylic resin solution 3 was prepared. The acrylic resin had a weight-average molecular weight of 20,000 and a double bond equivalent of 470.

(Preparing Acrylic Resin Solution 4)

560 parts of cyclohexanone was put into a reaction container, and heated to 80° C. while nitrogen gas was injected into the container, and a mixture of the following monomers and thermal polymerization initiator was dropped for one hour at the same temperature. Thereby, a polymerization reaction was performed.

| | |
|---|---|
| methacrylic acid | 34.0 parts |
| methyl methacrylate | 23.0 parts |
| n-butylmethacrylate | 25.0 parts |
| 2-hydroxy ethyl methacrylate | 70.5 parts |
| 2,2'-azobisisobutyronitrile | 8.0 parts |
| p-cumylphenol ethylene oxide-modified acrylate | 20.0 parts |

("Aronix M110", a product of TOAGOSEI CO., LTD.)

After dropping, the reaction was continued at 100° C. for an additional 3 hours. Thereafter, a solution prepared by dissolving 1.0 part by weight of azobisisobutyronitrile in 55 parts by weight of cyclohexanone was added to the liquid in the vessel, and the reaction was continued at 80° C. for an additional 1 hour to obtain a solution of copolymer.

Next, the following mixture of compounds was dropped into 338 parts by weight of the copolymer solution thus obtained at 70° C. for 3 hours.

| | |
|---|---|
| 2-methacryloylethyl isocyanate | 32.0 parts |
| lauric acid dibutyl tin | 0.4 parts |
| cyclohexanone | 120.0 parts |

After cooling to an ambient temperature, about 2 g of the above resin solution was taken as a sample. The sample was dried by heating at 180° C. for 20 minutes and a mass of nonvolatile matter was measured. Based on the results of the measurement, cyclohexanone was added to the above resin solution such that the concentration of the nonvolatile matter was 20% by weight. Thus, an acrylic resin solution 4 was prepared. The acrylic resin had a weight-average molecular weight of 20,000 and a double bond equivalent of 470.

<Manufacture of Salt Milling-Treated Red Pigment>

200 parts by weight of a red pigment (C. I. pigment red 254: "IRGAPHOR RED B-CF" manufactured by Ciba Specialty Chemicals, Inc.), 1,400 parts by weight of sodium chloride, and 360 parts by weight of diethylene glycol were charged into a 1-gallon kneader of stainless steel (manufactured by Inoue Manufacturing Co., Ltd.) and kneaded at 80° C. for 6 hours. Then, the kneaded product was added into 8 liters of hot water and the mixture was stirred for 2 hours while heating at 80° C. so as to obtain slurry. Filtrations of the slurry and washings of filter cake by water were repeated to remove sodium chloride and diethylene glycol from the pigment. After that, the filter cake was dried at 85° C. for a whole day and night to obtain 190 parts by mass of "Treated pigment of P. R. 254".

<Manufacture of Salt Milling-Treated Green Pigment>

"Treated pigment of P. G. 36" was obtained by the same method as that described for the salt milling-treated red pigment except that a green pigment (C. I. pigment green 36: "LIONOL GREEN 6YK" manufactured by Toyo Ink Manufacturing Co., Ltd.) was used instead of the red pigment.

<Manufacture of Salt Milling-Treated Yellow Pigment>

"Treated pigment of P. Y. 138" was obtained by the same method as that described for the salt milling-treated red pigment except that a yellow pigment (C. I. pigment yellow 138: "LIONOL YELLOW 1030" manufactured by Toyo Ink Manufacturing Co., Ltd.) was used instead of the red pigment.

<Manufacture of Salt Milling-Treated Blue Pigment>

"Treated pigment of P. B. 15:6" was obtained by the same method as that described for the salt milling-treated red pigment except that a blue pigment (C. I. pigment blue 15:6: "HELIOGEN BLUE L-6700F" manufactured by BASF Corp.) was used instead of the red pigment.

<Manufacture of Salt Milling-Treated Violet Pigment>

"Treated pigment of P. V. 23" was obtained by the same method as that described for the salt milling-treated red pigment except that a blue pigment (C. I. pigment violet 23: "LIONOGEN VIOLET R6200" manufactured by Toyo Ink Manufacturing Co., Ltd.) was used instead of the red pigment.

<Preparation of Red Pigment Dispersion>

The following substances were stirred to obtain a homogenous mixture. The mixture was subjected to a process of 10 hours using an Eiger mill so as to uniformly disperse the solid content in the liquid. Here, zirconia beads having a diameter of 0.5 mm were used as a grinding media. Then, the dispersion was filtrated to obtain red pigment dispersion. A filter capable of separating particles having a diameter of 1.0 μm or larger from liquid phase was used for the filtration.

| | |
|---|---|
| treated pigment of P.R.254 | 10.0 parts |
| dispersion aid (Solsperse 20000, a product of Avecia) | 1.0 parts |
| acrylic resin solution 1 | 34.0 parts |
| cyclohexanone | 55.0 parts |

<Preparation of Green Pigment Dispersion>

The following substances were stirred to obtain a homogenous mixture. The mixture was subjected to a process of 10 hours using an Eiger mill so as to uniformly disperse the solid content in the liquid. Here, zirconia beads having a diameter of 0.5 mm were used as a grinding media. Then, the dispersion was filtrated to obtain green pigment dispersion. A filter capable of separating particles having a diameter of 1.0 μm or larger from liquid phase was used for the filtration.

| | |
|---|---|
| treated pigment of P.G.36 | 10.0 parts |
| dispersion aid (Solsperse 20000, a product of Avecia) | 1.0 parts |
| acrylic resin solution 1 | 34.0 parts |
| cyclohexanone | 55.0 parts |

<Preparation of Yellow Pigment Dispersion>

The following substances were stirred to obtain a homogenous mixture. The mixture was subjected to a process of 10 hours using an Eiger mill so as to uniformly disperse the solid content in the liquid. Here, zirconia beads having a diameter of 0.5 mm were used as a grinding media. Then, the dispersion was filtrated to obtain yellow pigment dispersion. A filter capable of separating particles having a diameter of 1.0 μm or larger from liquid phase was used for the filtration.

| | |
|---|---|
| treated pigment of P.Y.138 | 10.0 parts |
| dispersion aid (Solsperse 20000, a product of Avecia) | 1.0 parts |
| acrylic resin solution 1 | 34.0 parts |
| cyclohexanone | 55.0 parts |

<Preparation of Blue Pigment Dispersion>

The following substances were stirred to obtain a homogenous mixture. The mixture was subjected to a process of 10 hours using an Eiger mill so as to uniformly disperse the solid content in the liquid. Here, zirconia beads having a diameter of 0.5 mm were used as a grinding media. Then, the dispersion was filtrated to obtain blue pigment dispersion. A filter capable of separating particles having a diameter of 1.0 μm or larger from liquid phase was used for the filtration.

| | |
|---|---|
| treated pigment of P.B.15:6 | 10.0 parts |
| dispersion aid (BYK111, a product of BYK Japan KK) | 1.0 parts |
| acrylic resin solution 2 | 34.0 parts |
| cyclohexanone | 55.0 parts |

<Preparation of Violet Pigment Dispersion>

The following substances were stirred to obtain a homogenous mixture. The mixture was subjected to a process of 10 hours using an Eiger mill so as to uniformly disperse the solid content in the liquid. Here, zirconia beads having a diameter of 0.5 mm were used as a grinding media. Then, the dispersion was filtrated to obtain violet pigment dispersion. A filter capable of separating particles having a diameter of 1.0 μm or larger from liquid phase was used for the filtration.

| | |
|---|---|
| treated pigment of P.V.23 | 10.0 parts |
| dispersion aid (BYK111, a product of BYK Japan KK) | 1.0 parts |
| acrylic resin solution 2 | 34.0 parts |
| cyclohexanone | 55.0 parts |

<Manufacture of Red Coloring Composition 1>

The following substances were stirred to obtain a homogenous mixture. The mixture was filtrated to obtain an alkaline developer-type red coloring composition. A filter capable of separating particles having a diameter of 0.6 μm or larger from liquid phase was used for the filtration.

| | |
|---|---|
| Red pigment dispersion liquid | 65.0 parts |
| acrylic resin solution 3 | 15.0 parts |
| trimethylolpropane triacrylate | 3.5 parts |
| (NK Ester ATMPT, a product of Shin-Nakamura chemical co,. LTD.) | |
| photopolymerization initiator | 2.2 parts |
| (Irgacure 907, a product of Ciba Japan K.K.) | |
| sensitizer (EAB-F, a product of Hodogaya Chemical Co., LTD.) | 0.3 parts |
| cyclohexanone | 14.0 parts |

<Manufacture of Red Coloring Composition 2>

The following substances were stirred to obtain a homogenous mixture. The mixture was filtrated to obtain an alkaline developer-type red coloring composition. A filter capable of separating particles having a diameter of 0.6 μm or larger from liquid phase was used for the filtration.

| | |
|---|---|
| Red pigment dispersion liquid | 33.0 parts |
| acrylic resin solution 3 | 45.0 parts |
| trimethylolpropane triacrylate | 3.5 parts |
| (NK Ester ATMPT, a product of Shin-Nakamura chemical co,. LTD.) | |
| photopolymerization initiator | 2.2 parts |
| (Irgacure 907, a product of Ciba Japan K.K.) | |
| sensitizer (EAB-F, a product of Hodogaya Chemical Co., LTD.) | 0.3 parts |
| cyclohexanone | 16.0 parts |

<Manufacture of Green Coloring Composition 1>

The following substances were stirred to obtain a homogenous mixture. The mixture was filtrated to obtain an alkaline developer-type green coloring composition. A filter capable of separating particles having a diameter of 0.6 μm or larger from liquid phase was used for the filtration.

| | |
|---|---|
| Green pigment dispersion liquid | 53.0 parts |
| Yellow pigment dispersion liquid | 32.0 parts |
| acrylic resin solution 3 | 3.0 parts |
| trimethylolpropane triacrylate | 3.5 parts |
| (NK Ester ATMPT, a product of Shin-Nakamura chemical co,. LTD.) | |
| photopolymerization initiator | 2.2 parts |
| (Irgacure 907, a product of Ciba Japan K.K.) | |
| sensitizer (EAB-F, a product of Hodogaya Chemical Co., LTD.) | 0.3 parts |
| cyclohexanone | 6.0 parts |

<Manufacture of Green Coloring Composition 2>

The following substances were stirred to obtain a homogenous mixture. The mixture was filtrated to obtain an alkaline developer-type green coloring composition. A filter capable of separating particles having a diameter of 0.6 μm or larger from liquid phase was used for the filtration.

| | |
|---|---|
| Green pigment dispersion liquid | 25.5 parts |
| Yellow pigment dispersion liquid | 15.5 parts |
| acrylic resin solution 3 | 38.0 parts |
| trimethylolpropane triacrylate | 3.5 parts |
| (NK Ester ATMPT, a product of Shin-Nakamura chemical co,. LTD.) | |
| photopolymerization initiator | 2.2 parts |
| (Irgacure 907, a product of Ciba Japan K.K.) | |
| sensitizer (EAB-F, a product of Hodogaya Chemical Co., LTD.) | 0.3 parts |
| cyclohexanone | 15.0 parts |

<Manufacture of Blue Coloring Composition 1>

The following substances were stirred to obtain a homogenous mixture. The mixture was filtrated to obtain an alkaline developer-type blue coloring composition. A filter capable of separating particles having a diameter of 0.6 μm or larger from liquid phase was used for the filtration.

| | |
|---|---|
| Blue pigment dispersion liquid | 45.0 parts |
| violet pigment dispersion liquid | 5.0 parts |
| acrylic resin solution 4 | 30.0 parts |
| trimethylolpropane triacrylate | 3.5 parts |
| (NK Ester ATMPT, a product of Shin-Nakamura chemical co,. LTD.) | |
| photopolymerization initiator | 2.2 parts |
| (Irgacure 907, a product of Ciba Japan K.K.) | |
| sensitizer (EAB-F, a product of Hodogaya Chemical Co., LTD.) | 0.3 parts |
| cyclohexanone | 4.0 parts |

<Manufacture of Blue Coloring Composition 2>

The following substances were stirred to obtain a homogenous mixture. The mixture was filtrated to obtain an alkaline developer-type blue coloring composition. A filter capable of separating particles having a diameter of 0.6 μm or larger from liquid phase was used for the filtration.

| | |
|---|---|
| Blue pigment dispersion liquid | 22.5 parts |
| violet pigment dispersion liquid | 2.5 parts |
| acrylic resin solution 4 | 52.0 parts |
| trimethylolpropane triacrylate | 3.5 parts |
| (NK Ester ATMPT, a product of Shin-Nakamura chemical co,. LTD.) | |
| photopolymerization initiator | 2.2 parts |
| (Irgacure 907, a product of Ciba Japan K.K.) | |
| sensitizer (EAB-F, a product of Hodogaya Chemical Co., LTD.) | 0.3 parts |
| cyclohexanone | 17.0 parts |

Example 1

The above red coloring composition 1 was applied by a spin coater, then dried and heated in a clean oven at 70° C. for 20 min. to obtain an applied substrate. This substrate was cooled to room temperature. Thereafter, it was exposed to a UV ray through a photo mask using an extra-high-pressure mercury-vapor lamp. Thereafter, this substrate was subjected to a spray development using a sodium carbonate solution of 23° C. Further, the substrate was washed using ion-exchange water, then, dried by air. Further, the substrate was burned at 230° C. for 30 min. in a clean oven. Thereby, a transmission part of a red pixel was formed on a substrate. Next, a transmission part of a green pixel was formed using a green coloring composition 1 by the same method. Further, a transmission part of a blue pixel was formed using a blue coloring composition 1. In all cases, a film thickness of a transmission part of a pixel of respective colors was 2.0 μm (identical).

Figure 1:
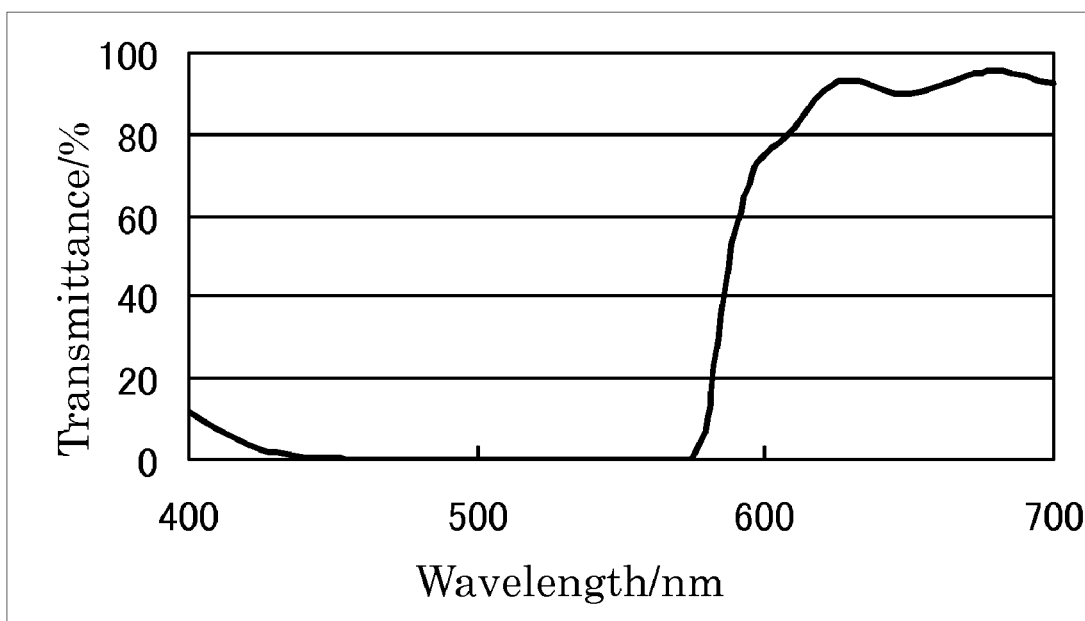
FIG. 1 shows a spectral transmission of a transmission part of a red pixel obtained by red coloring composition 1.
Figure 2:
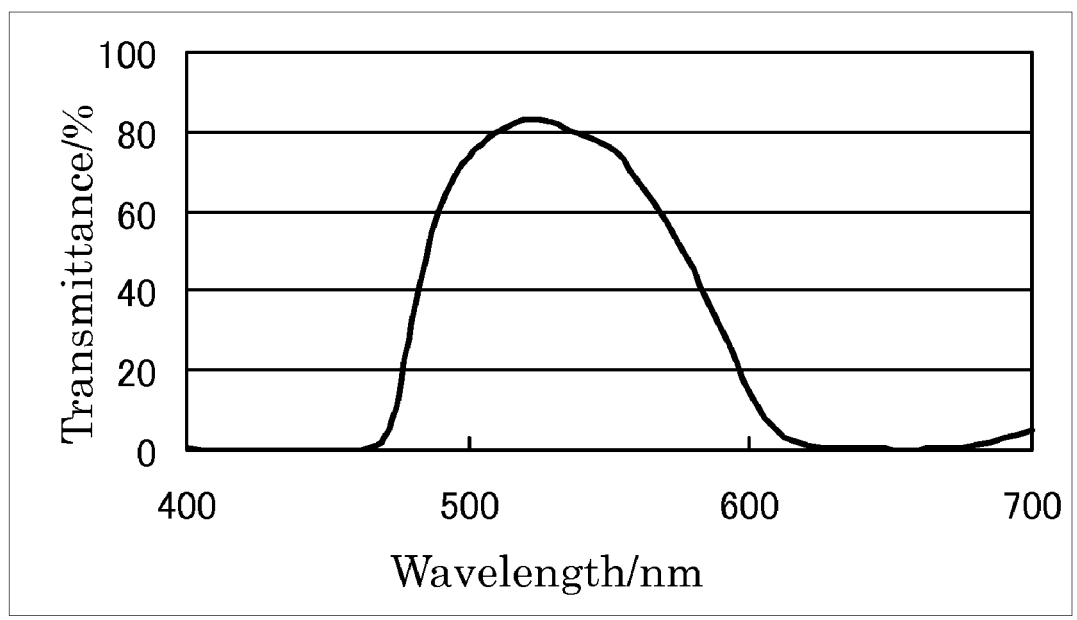
FIG. 2 shows a spectral transmission of a transmission part of a green pixel obtained by green coloring composition 1.
Figure 3:
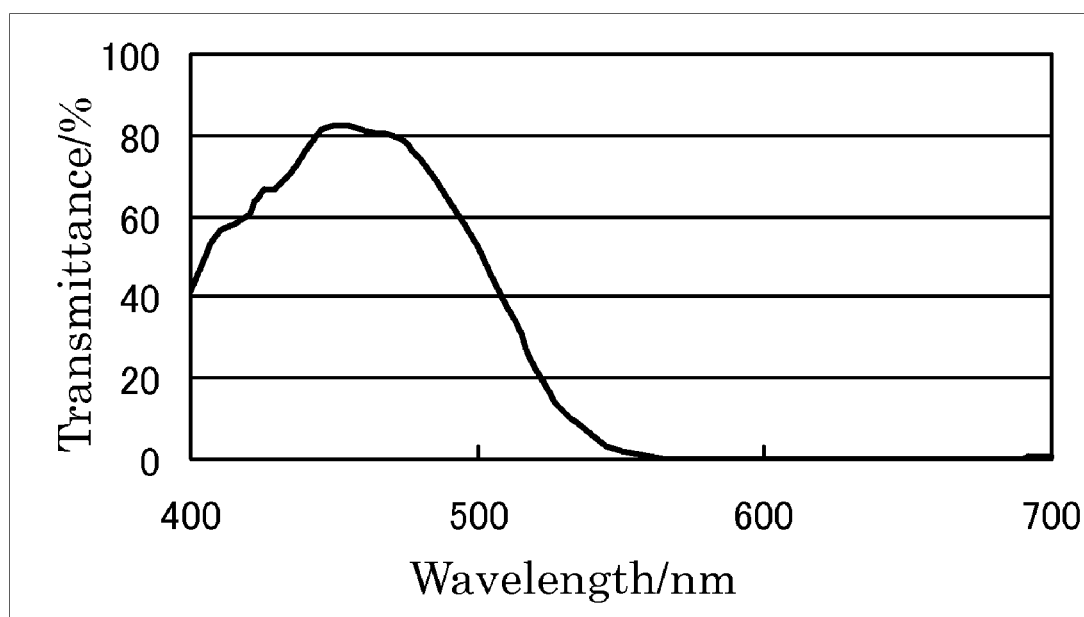
FIG. 3 shows a spectral transmission of a transmission part of a blue pixel obtained by blue coloring composition 1.

Color characteristics of the transmission part of the pixel are shown in Table 1, and spectral transmissions are shown in FIGS. 1-3.

TABLE 1

| | Chromaticity (C light source) | | | Center wave- | transmittance | | |
|---|---|---|---|---|---|---|---|
| | x | y | Y | length | 450 nm | 535 nm | 630 nm |
| transmission part of red pixel | 0.650 | 0.335 | 20.1 | 630 nm | 0.4% | 0.1% | 94.3% |
| transmission part of green pixel | 0.275 | 0.600 | 53.7 | 535 nm | 0.2% | 82.3% | 0.7% |
| transmission part of blue pixel | 0.135 | 0.102 | 11.6 | 450 nm | 82.4% | 8.6% | 0.1% |

(Forming a Reflection Part of a Pixel)

The above red coloring composition 2 was applied by a spin coater. It was dried and heated in a clean oven at 70° C. for 20 min. to obtain an applied substrate. This substrate was cooled to room temperature. Thereafter, it was exposed to a UV ray through a photo mask using an extra-high-pressure mercury-vapor lamp. Thereafter, this substrate was subjected to a spray development using a sodium carbonate solution of 23° C. Further, it was washed using ion-exchange water and then dried by air. Further, the substrate was burned at 230° C. for 30 min. in a clean oven. Thereby, a reflection part of a red pixel was formed on a substrate. Next, a reflection part of a green pixel was formed using a green coloring composition 2 by the same method. Further, a reflection part of a blue pixel was formed using a blue coloring composition 2. In all cases, a film thickness of a reflection pixel of respective colors was 2.0 μm (identical).

Figure 4:
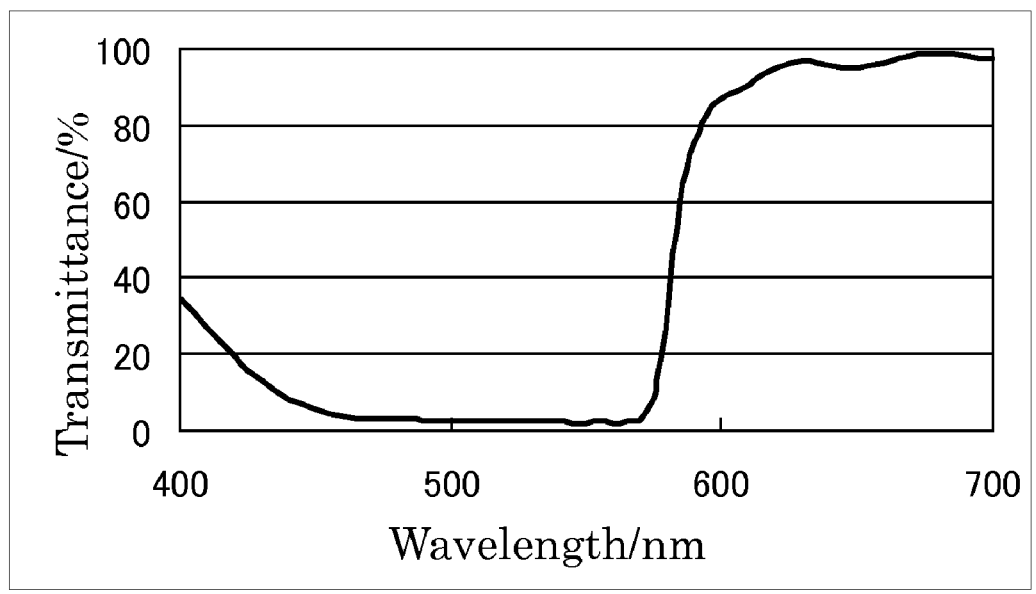
FIG. 4 shows a spectral transmission of a reflection part of red a pixel obtained by red coloring composition 2.
Figure 5:
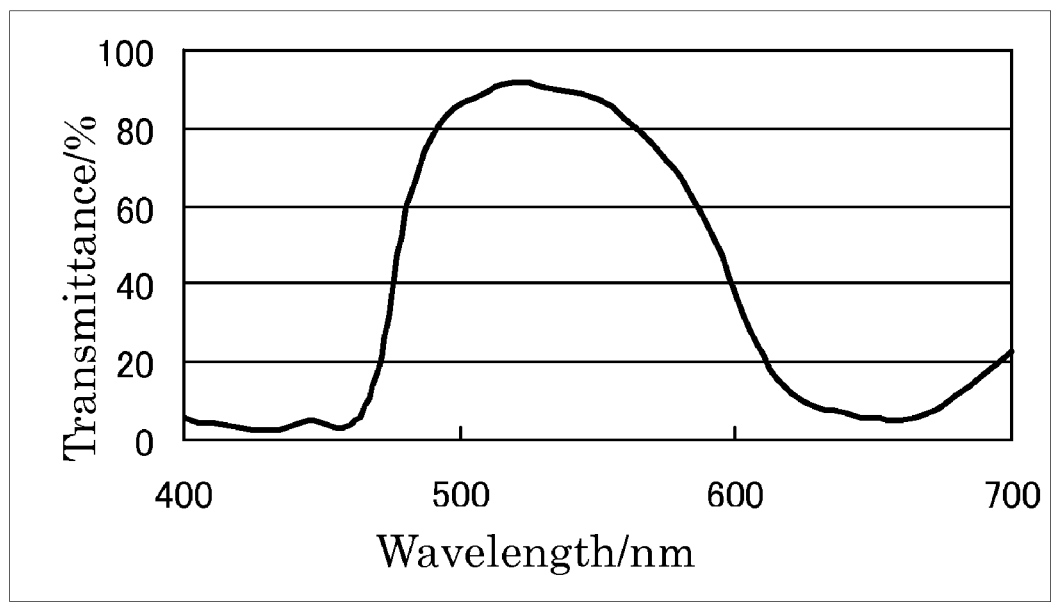
FIG. 5 shows a spectral transmission of a reflection part of a green pixel obtained by green coloring composition 2.
Figure 6:
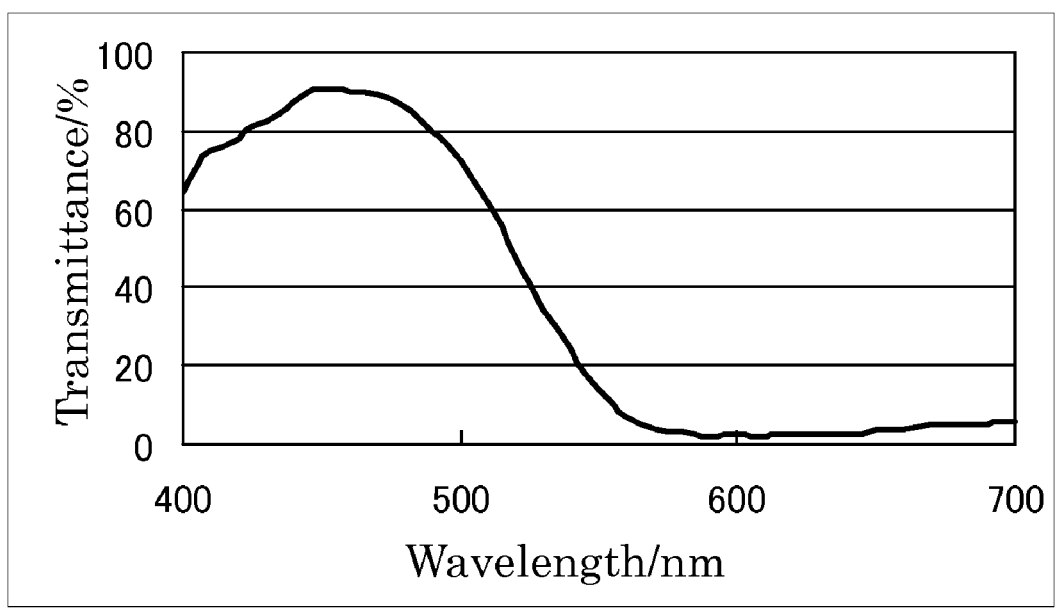
FIG. 6 shows a spectral transmission of a reflection part of a blue pixel obtained by blue coloring composition 2.

Color characteristics of the reflection part of a pixel are shown in Table 2, and spectral transmissions are shown in FIGS. 4-6.

TABLE 2

| | Chromaticity (C light source) | | | Center wave- | transmittance | | |
|---|---|---|---|---|---|---|---|
| | x | y | Y | length | 450 nm | 535 nm | 630 nm |
| Reflection part of red pixel | 0.580 | 0.320 | 25.5 | 630 nm | 5.4% | 2.3% | 95.0% |
| Reflection part of green pixel | 0.302 | 0.540 | 67.0 | 535 nm | 4.2% | 88.8% | 8.1% |
| Reflection part of blue pixel | 0.147 | 0.158 | 22.0 | 450 nm | 87.8% | 28.9% | 2.3% |

(Forming an Alignment Film)

An alignment film material ("SE-1410", a product of Nissan Chemical Industries, Ltd.) was applied to a color filter layer of the substrate by a spin coater so that a film thickness of the dried material was 0.1 μm. This substrate was heated and dried on a hot plate at 90° C. for 1 min. and then burned in a clean oven at 230° C. for 40 min. Then, this substrate was subjected to a rubbing process. Thereby, a substrate having an alignment performance was obtained.

(Process of a Retardation Thin Film (a))

A mixture having the following composition was stirred and mixed so that the mixture became uniform. Thereafter, the mixture was filtered using a filter of 0.6 μm to obtain a liquid crystal compound. The liquid crystal compound was applied on the alignment film of the substrate by a spin coater so that a film thickness of dried liquid crystal compound became 1.6 μm. Thereafter, it was heated and dried at 90° C. for 2 min. by a hot plate to obtain a liquid crystal alignment substrate.

| | |
|---|---|
| Horizontally oriented polymerizable liquid crystal ("PALIOCOLOR LC 242" manufactured by BASF Japan Corp.) | 39.7 parts |
| photopolymerization initiator (Irgacure 907, a product of Ciba Japan K.K.) | 0.3 parts |
| surface active agent (cyclohexanone solution of 2% BYK330 (a product of BYK Japan KK)) | 6.0 parts |
| cyclohexanone | 154.0 parts |

(Process of a Retardation Thin Film (b))

Next, in the liquid crystal alignment substrate, regions of respective colors of reflection parts were respectively exposed to a UV ray through a photo mask using an extra-high-pressure mercury-vapor lamp. Irradiance of UV was 500 mJ/m$^2$ for a reflection part of a red pixel region. Irradiance of UV was 200 mJ/m$^2$ for a reflection part of a green pixel region. Irradiance of UV was 5 mJ/m$^2$ for a reflection part of a blue pixel region. Regions of respective colors of a transmission part were not exposed.

(Processes of a Retardation Thin Film (c) and (d))

Next, the substrate was put in a clean oven in order to burn the substrate at 230° C. for 40 minutes. Thereby, a color filter substrate with a retardation thin film was obtained.

Optical anisotropy of regions of respective colors of the color filter substrate was measured. In the reflection part of a red pixel region, in-plane retardation was 160 nm, and birefringence index was 0.101 wherein birefringence index was obtained by calculation using in-plane retardation, in the case of light of wavelength of 630 nm. In the reflection part of a green pixel region, in-plane retardation was 137 nm, and birefringence index was 0.087, in the case of light of wavelength of 535 nm. In the reflection part of a blue pixel region, in-plane retardation was 115 nm, and birefringence index was 0.075, in the case of light of wavelength of 450 nm. In a transmission part pixel, in all the regions of respective colors, retardation is almost not observed. The results are shown in Table 3.

TABLE 3

| | | Wavelength for | | Characteristics of retardation thin film | | | |
|---|---|---|---|---|---|---|---|
| | | exposure amount | measuring retardation | In-plate retardation | Film thickness | birefringence index | Δn[fr]/λ d [fr] (note) |
| Reflection part | Red pixel region | 500 mJ | 630 nm | 157 nm | 1.6 μm | 0.101 | 1.000 |
| | Green pixel region | 200 mJ | 535 nm | 133 nm | 1.5 μm | 0.087 | 0.997 |
| | Blue pixel region | 5 mJ | 450 nm | 114 nm | 1.5 μm | 0.074 | 1.016 |
| Transmission part | Red pixel region | 0 mJ | 630 nm | 0.5 nm | 1.5 μm | $3.0 \times 10^{-4}$ | — |
| | Green pixel region | 0 mJ | 535 nm | 0.6 nm | 1.5 μm | $3.0 \times 10^{-4}$ | — |
| | Blue pixel region | 0 mJ | 450 nm | 0.8 nm | 1.5 μm | $4.0 \times 10^{-4}$ | — |

(note): Δn[fr] is a ratio of in-plate birefringence index of respective pixel to in-plane birefringence index of a reflection part of a red pixel. λ d[fr] is (d[f1] × λ[f2])/(d[f2] × λ[f1]). d[f1] is a film thickness of a retardation thin film in a reflection part of a red pixel. d[f2] is a film thickness of a retardation thin film in respective pixels. λ[f1] is a center wavelength of a color of a reflection part of a red pixel. λ[f2] is a center wavelength of a color of a reflection part of respective pixels. Hereinafter, these definitions are applied to Tables 5 and 6.

(Manufacturing a Liquid Crystal Display Device)

A transparent indium tin oxide (ITO) electrode layer was formed on the color filter substrate. Further, a columnar spacer made of a resin was formed so that a cell gap was equal to ½ of a wavelength. A cell gap adjustment layer was formed at reflection pixel regions of respective colors so that a film thickness of the cell gap adjustment layer was a half of the film thickness of the columnar spacer. Thereafter, a polyimide oriented layer formed thereon. On the other hand, a reflection layer was formed on a region of one surface of surfaces of another (second) glass substrate, the region corresponding to a reflection pixel of the color filter substrate. Further, a TFT array and a pixel electrode were formed. Thereafter, a polyimide oriented layer was formed thereon to obtain a TFT array substrate.

An acrylic epoxy type adhesive mixed with a spacer particle was applied on periphery part of a polyimide oriented layer formation surface of the color filter substrate by a seal application device. A vertical alignment type nematic liquid crystal having a negative dielectric anisotropy was dropped on a region surrounded by the adhesive. Next, under a vacuum of about 1 Pa, this color filter substrate was arranged over the TFT array substrate so that the oriented layers faced each other while position adjustment was performed. Thereafter, the adhesive was cured by UV ray irradiation, and burning was performed at 120° C. for 1 hour to obtain a liquid crystal cell. This liquid crystal cell was arranged between a pair of polarizing plates so that a pre-twist angle of a liquid crystal layer and an angle between a slow axis of a retardation thin film and absorption axis of a polarizing plate were 45°. This was combined with a backlight unit to obtain a liquid crystal display device. The obtained liquid crystal display device was as follows. In the case where a backlight was on and a voltage was applied (transmission white display), bright white was observed. In the case where a backlight was on and a voltage was not applied (transmission black display), a so-called tightened black color was observed. In addition, the obtained liquid crystal display device under illuminating light was as follows. In the case where a backlight was off and a voltage was applied (reflection white display), white without color was observed. In the case where a backlight was off and a voltage was not applied (transmission black display), black without color was observed.

Example 2

(Forming a Transmission Part of a Pixel)

A transmission part of a red pixel, a transmission part of a green pixel and a transmission part of a blue pixel were formed on a glass substrate by the same method as Example 1. All of the transmission pixels of respective colors had a thickness of 2.0 μm the same as Example 1. All of the color characteristics of respective colors were almost the same as Example 1.

(Forming a Reflection Part of a Pixel)

The above red coloring composition 1 was applied by a spin coater so that a film thickness thereof was smaller than that of the transmission pixel. It was dried and heated in a clean oven at 70° C. for 20 min. to obtain an applied substrate. This substrate was cooled to room temperature. Thereafter, it was exposed to a UV ray through a photo mask using an extra-high-pressure mercury-vapor lamp. Thereafter, this substrate was subjected to a spray development using a sodium carbonate solution of 23° C. Further, it was washed using ion-exchange water and then dried by air. Further, it was burned at 230° C. for 30 min. in a clean oven. Thereby, a reflection part of a red pixel was formed on a substrate. Next, a green pixel was formed using a green coloring composition 2 by the same method. Further, a blue pixel was formed using a blue coloring composition 2. In all cases, a film thickness of a reflection pixel of respective colors was 1.0 μm (identical).

Figure 7:
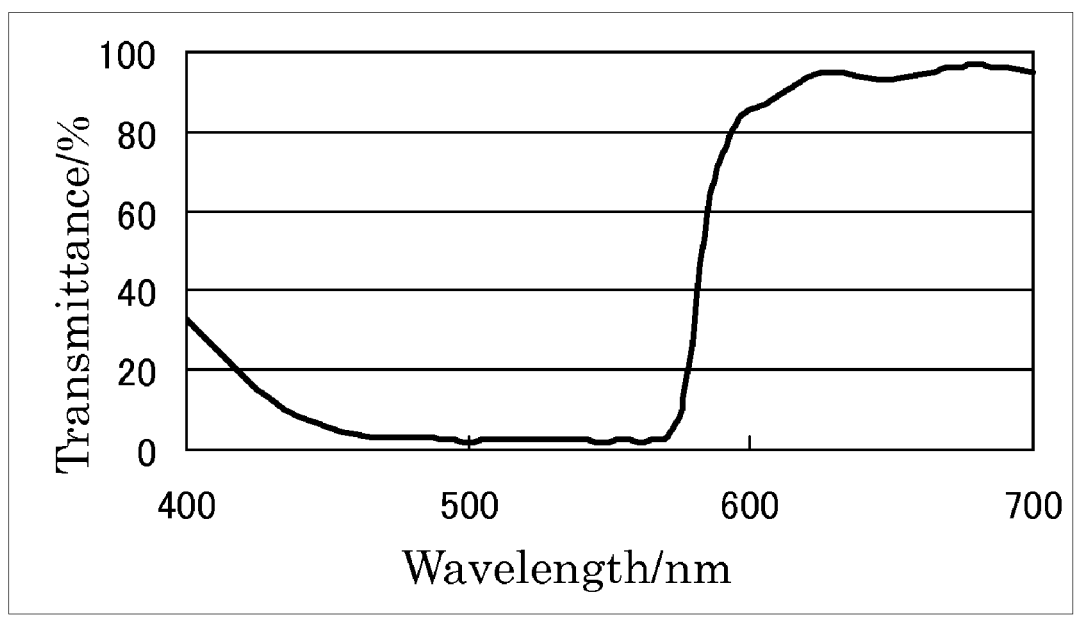
FIG. 7 shows a spectral transmission of a reflection part of a red pixel obtained by red coloring composition 1.
Figure 8:
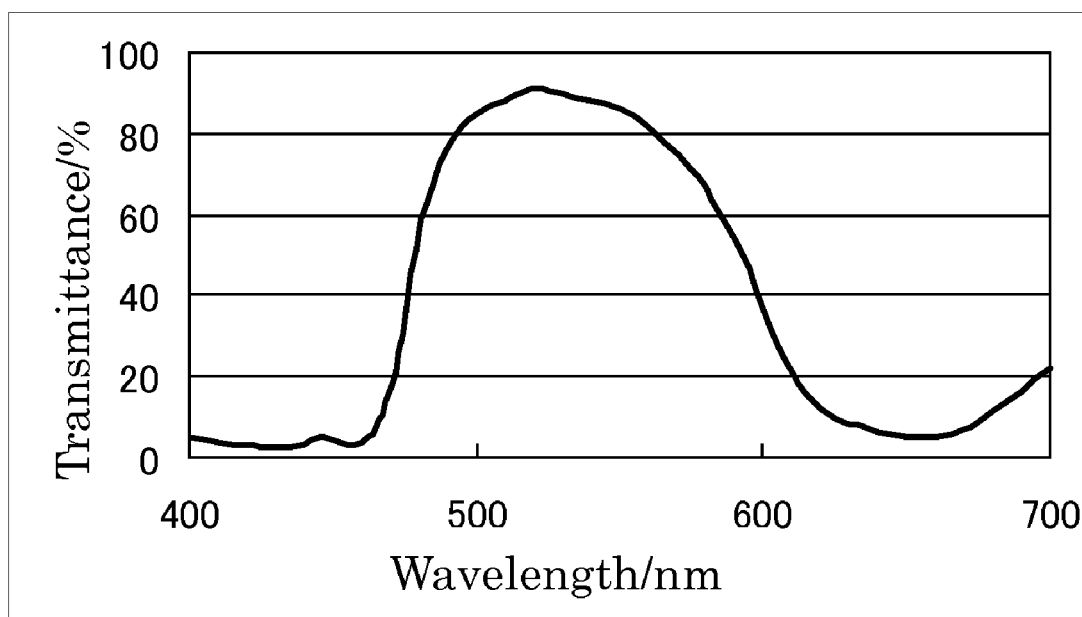
FIG. 8 shows a spectral transmission of a reflection part of a red pixel obtained by red coloring composition 1.
Figure 9:
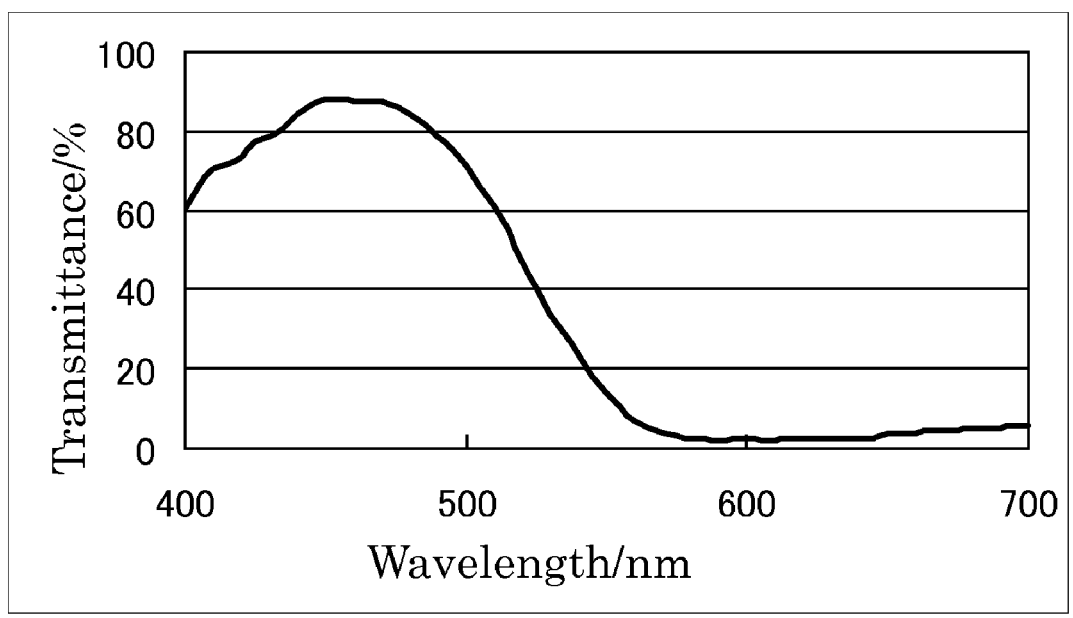
FIG. 9 shows a spectral transmission of a reflection part of a red pixel obtained by red coloring composition 1.

Color characteristics of the reflection pixel are shown in Table 4, and spectral transmissions are shown in FIGS. 7-9.

TABLE 4

|  | Chromaticity (C light source) | | | Center wave-length | transmittance | | |
| --- | --- | --- | --- | --- | --- | --- | --- |
|  | x | y | Y | | 450 nm | 535 nm | 630 nm |
| Reflection part of red pixel | 0.580 | 0.320 | 26.0 | 630 nm | 5.7% | 2.5% | 96.6% |
| Reflection part of green pixel | 0.302 | 0.538 | 67.9 | 535 nm | 4.4% | 89.7% | 8.3% |
| Reflection part of blue pixel | 0.148 | 0.154 | 22.3 | 450 nm | 90.6% | 29.2% | 2.4% |

(Process of a Retardation Thin Film (a))

After a color filter layer was formed, following processes were performed. A mixture having the following composition was stirred and mixed so that the mixture became uniform. Thereafter, the mixture was filtered using a filter of 0.6 μm to obtain a liquid crystal compound. The liquid crystal compound was applied on the color filter layer of the substrate by a spin coater so that a film thickness of dried liquid crystal compound became 3.3 μm. Thereafter, it was heated and dried at 90° C. for 2 min. by a hot plate to obtain a liquid crystal alignment substrate.

| | |
| --- | --- |
| Horizontally oriented polymerizable liquid crystal (UCL-018, a product of DIC corporation) | 19.1 parts |
| photopolymerization initiator (Irgacure 907, a product of Ciba Japan K.K.) | 0.9 parts |
| surface active agent (cyclohexanone solution of 2% BYK330 (a product of BYK Japan KK)) | 3.0 parts |
| cyclohexanone | 77.0 parts |

(Process of a Retardation Thin Film (b))

Next, in the liquid crystal alignment substrate, regions of respective colors of reflection parts were respectively exposed to a UV ray through a photo mask using an extra-high-pressure mercury-vapor lamp. Irradiance of UV was 500 mJ/m$^2$ for a red pixel region. Irradiance of UV was 30 mJ/m$^2$ for a green pixel region. Irradiance of UV was 10 mJ/m$^2$ for a blue pixel region.

(Processes of a Retardation Thin Film (c) and (d))

Next, the substrate was maintained at 80° C. by a hot plate under a nitrogen atmosphere. In this situation, the entire surface of the substrate was exposed to a UV ray using an extra-high-pressure mercury-vapor lamp. Thereby, a color filter substrate with a retardation thin film was obtained.

Optical anisotropy of regions of respective colors of the color filter substrate was measured. In the reflection part of a red pixel region, in-plane retardation was 160 nm, and birefringence index was 0.101, in the case of light of wavelength of 630 nm. In the reflection part of a green pixel region, in-plane retardation was 137 nm, and birefringence index was 0.087, in the case of light of wavelength of 535 nm. In the reflection part of a blue pixel region, in-plane retardation was 115 nm, and birefringence index was 0.075, in the case of light of wavelength of 450 nm. In a transmission part pixel, in all the regions of respective colors, retardation is almost not observed. The results are shown in Table 5.

TABLE 5

| | | Wavelength for | | Characteristics of retardation thin film | | | |
| --- | --- | --- | --- | --- | --- | --- | --- |
| | | exposure amount | measuring retardation | In-plate retardation | Film thickness | birefringence index | Δn[fr]/λ d[fr] |
| Reflection part | Red pixel region | 500 mJ | 630 nm | 155 nm | 1.1 μm | 0.138 | 1.000 |
| | Green pixel region | 30 mJ | 535 nm | 134 nm | 1.1 μm | 0.126 | 1.022 |
| | Blue pixel region | 10 mJ | 450 nm | 118 nm | 1.1 μm | 0.110 | 1.068 |
| Transmission part | Red pixel region | 0 mJ | 630 nm | 0.3 nm | 1.1 μm | $2.8 \times 10^{-4}$ | — |
| | Green pixel region | 0 mJ | 535 nm | 0.3 nm | 1.1 μm | $2.8 \times 10^{-4}$ | — |
| | Blue pixel region | 0 mJ | 450 nm | 0.5 nm | 1.1 μm | $2.8 \times 10^{-4}$ | — |

(Manufacturing a Liquid Crystal Display Device)

The obtained color filter substrate was subjected to necessary processes, and a TFT array substrate was manufactured by the same method as example 1. Both substrates were attached to each other and thereby a liquid crystal cell was obtained. This liquid crystal cell was arranged between a pair of polarizing plates of crossed nicols. This device was combined with a backlight unit and thereby a liquid crystal display was manufactured.

The obtained liquid crystal display was as follows. In the case where a voltage was applied while a backlight was on (transmission white display), bright white was observed. In the case where a voltage was not applied while a backlight was on (transmission black display), a so-called tightened black color was observed. In addition, the obtained liquid crystal display under illuminating light was as follows. In the case where a voltage was applied while a backlight was off (reflection white display), white without color was obtained.

In the case where a voltage was not applied while a backlight was off (transmission black display), black without color was observed.

Comparative Example 1

(Forming a Transmission Pixel)

A transmission part of a red pixel, a transmission part of a green pixel and a transmission part of a blue pixel were formed on a glass substrate by the same method as Example 1. All of the transmission pixels of respective colors had a thickness of 2.0 μm the same as Example 1. All of the color characteristics of respective colors were almost the same as Example 1.

(Forming a Reflection Pixel)

A reflection part of a red pixel, a reflection part of a green pixel and a reflection part of a blue pixel were formed on a glass substrate by the same method as Example 1. All of the reflection pixels of respective colors had a thickness of 2.0 μm the same as Example 1. All of the color characteristics of respective colors were almost the same as Example 1.

(Forming an Alignment Film)

A material of an alignment film was applied to a color filter layer of the substrate by the same method as Example 1. Next, a rubbing process was performed to this substrate. Thereby, a substrate having an orienting force was obtained.

(Process of a Retardation Thin Film (a))

A liquid crystal compound which had the same composition as Example 1 was applied to an alignment film of the substrate by a spin coater so that a film thickness of the dried compound was 1.3 μm. Thereafter, the substrate was heated and dried at 90° C. for 2 minutes by a hot plate and thereby a liquid crystal alignment substrate was obtained.

(Process of a Retardation Thin Film (b))

Next, in the liquid crystal alignment substrate, regions of respective colors of reflection parts were respectively exposed to a UV ray through a photo mask using an extra-high-pressure mercury-vapor lamp. Irradiance of UV was 500 mJ/m$^2$ for all of the regions of respective colors of the reflection parts. Regions of respective colors of transmission parts were not exposed.

(Processes of a Retardation Thin Film (c) and (d))

Next, the substrate was put in a clean oven in order to burn the substrate at 230° C. for 40 minutes. Thereby, a color filter substrate with a retardation thin film was obtained.

Optical anisotropy of regions of respective colors of the color filter substrate was measured. In the reflection part of a red pixel region, in-plane retardation was 131 nm, and birefringence index was 0.099, in the case of light of wavelength of 630 nm. In the reflection part of a green pixel region, in-plane retardation was 137 nm, and birefringence index was 0.103, in the case of light of wavelength of 535 nm. In the reflection part of a blue pixel region, in-plane retardation was 149 nm, and birefringence index was 0.113, in the case of light of wavelength of 450 nm. The difference between in-plane retardations of respective colors was based on characteristics of wavelength dispersion of a refractive index of a material. In the transmission part pixel, in all of the regions of respective colors, retardation is almost not observed. The results are shown in Table 6.

TABLE 6

|  |  | exposure amount | Wavelength for measuring retardation | In-plate retardation | Film thickness | birefringence index | Δn[fr]/λ d[fr] |
|---|---|---|---|---|---|---|---|
| Reflection part | Red pixel region | 500 mJ | 630 nm | 131 nm | 1.3 μm | 0.099 | 1.000 |
|  | Green pixel region | 500 mJ | 535 nm | 137 nm | 1.3 μm | 0.103 | 1.231 |
|  | Blue pixel region | 500 mJ | 450 nm | 149 nm | 1.3 μm | 0.113 | 1.592 |
| Transmission part | Red pixel region | 0 mJ | 630 nm | 0.5 nm | 1.3 μm | $3.2 \times 10^{-4}$ | — |
|  | Green pixel region | 0 mJ | 535 nm | 0.6 nm | 1.3 μm | $3.2 \times 10^{-4}$ | — |
|  | Blue pixel region | 0 mJ | 450 nm | 0.8 nm | 1.3 μm | $3.2 \times 10^{-4}$ | — |

(Manufacturing a Liquid Crystal Display Device)

The obtained color filter substrate was subjected to necessary processes by the same method as example 1, and a TFT array substrate was manufactured. Both substrates were attached to each other and thereby a liquid crystal cell was obtained. This liquid crystal cell was arranged between a pair of polarizing plates of crossed nicols. This device was combined with a backlight unit and thereby a liquid crystal display was manufactured.

The obtained liquid crystal display was as follows. Good display quality was obtained the same as example 1 where a backlight was on both in the case where a voltage was applied (transmission white display) and in the case where a voltage was not applied (transmission black display). However, the obtained liquid crystal display under illuminating light was as follows. In the case where a voltage was applied while a backlight was off (reflection white display), white with a little green was observed. In the case where a voltage was not applied while a backlight was off (transmission black display), black with red-purple color was observed.

Simulation Examples

Hereinafter, effects of the present invention are described by examples of optical calculation results. However, a desirable structure of the present invention is not limited to these examples.

Firstly, the common conditions between calculations are explained.

(Common Condition-Polarizing Plate)

A polarizing plate is as follows.

The transmittance of a single plate was, 40.24% at wavelength of 450 nm, 43.52% at wavelength of 535 nm and 43.95% at wavelength of 630 nm.

In the case where two polarizing plates are arranged so that a transmission axis thereof are parallel to each other, the transmittance was 32.19% at wavelength of 450 nm, 37.57% at wavelength of 535 nm and 38.28% at wavelength of 630 nm.

In the case where two polarizing plates are arranged so that a transmission axis thereof are perpendicular to each other, the transmittance was 0.015% at wavelength of 450 nm, 0.004% at wavelength of 535 nm and 0.001% at wavelength of 630 nm.

Figure 10:
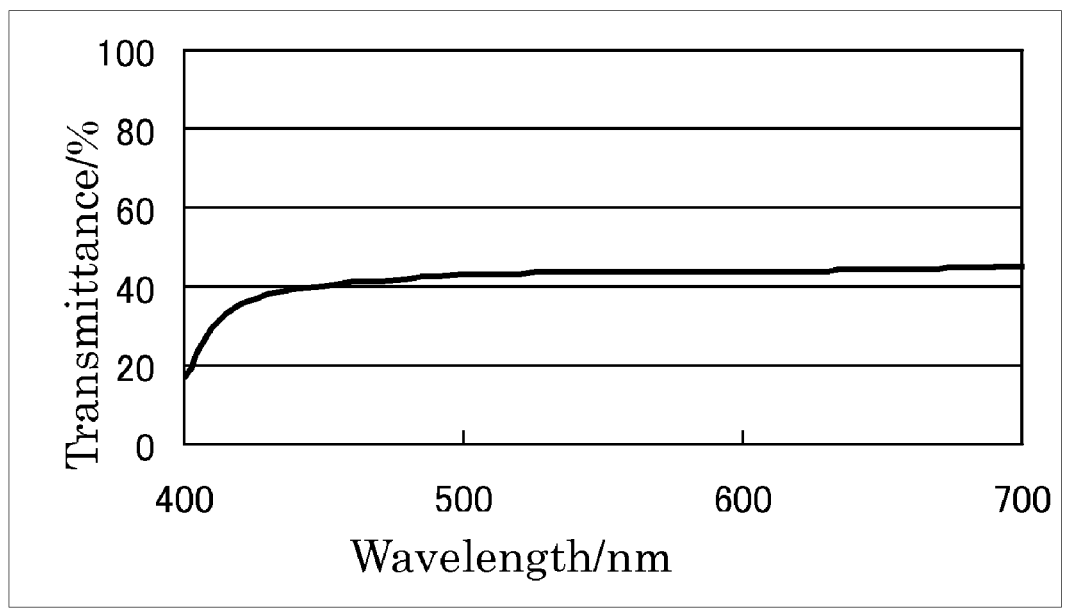
FIG. 10 shows a spectral transmission of a single polarizing plate.
Figure 11:
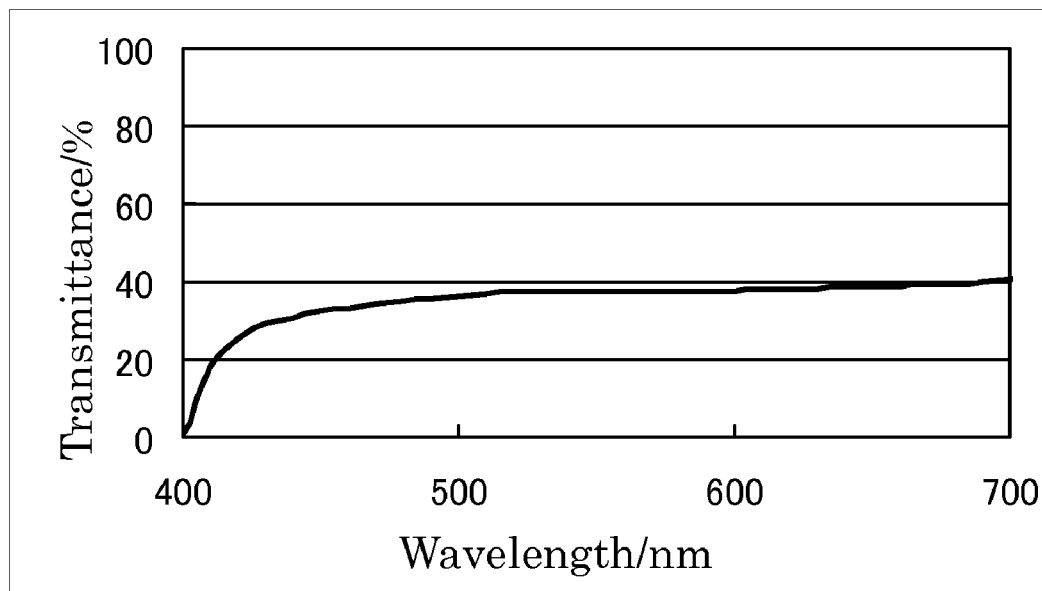
FIG. 11 shows a spectral transmission in the case where two polarizing plates are arranged such that one is parallel to the other.
Figure 12:
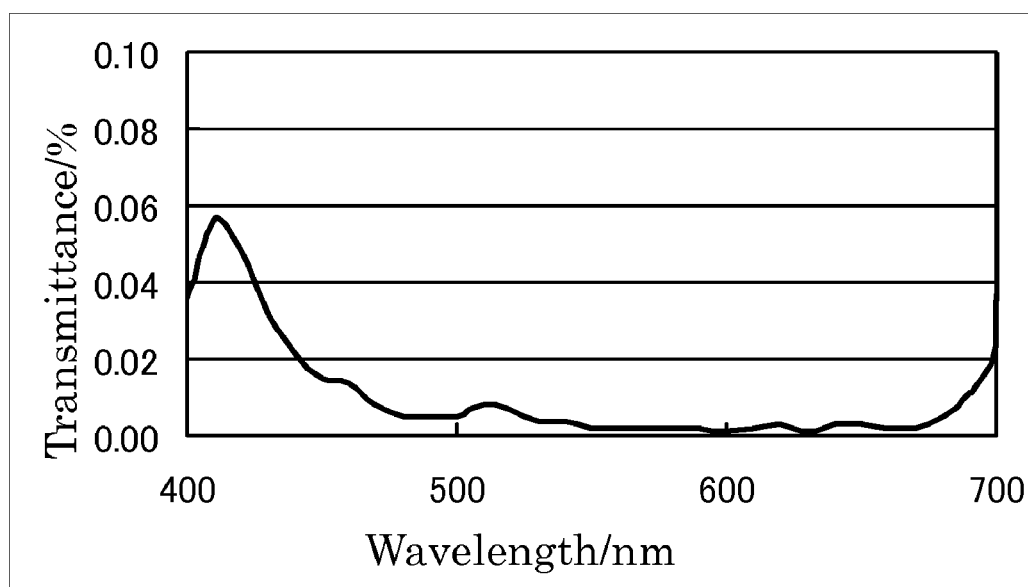
FIG. 12 shows a spectral transmission in the case where two polarizing plates are arranged such that one is perpendicular to the other.

A refractive index thereof was 1.51 at any wavelength. A thickness thereof was 180 μm. Spectral transmittance of a polarizing plate is shown in FIGS. 10-12.

(Common Condition-Glass Substrate)

A refractive index of a glass substrate was 1.5. Transmittance thereof was 100%. A thickness thereof was 0.7 mm.

(Common Condition-Color Filter)

The following spectral transmittance was adopted for a color filter layer.

In a reflection part of a pixel, spectral transmittances of films of 2 μm thickness of a red coloring composition 2, a green coloring composition 2 and a blue coloring composition 2 which are obtained in Examples are adopted.

In a transmission part of a pixel, spectral transmittances of films of 2 μm thickness of a red coloring composition 1, a green coloring composition 1 and a blue coloring composition 1 which are obtained in Examples are adopted.

All of the refractive indexes thereof were 1.7 at any wavelength. A thickness thereof was 2.0 μm. The color characteristics of a color filter is shown in Table 7.

TABLE 7

| | | Chromaticity (C light source) | | | Center wavelength | transmittance | | |
|---|---|---|---|---|---|---|---|---|
| | | x | y | Y | | 450 nm | 535 nm | 630 nm |
| Reflection part | Red pixel region | 0.580 | 0.320 | 25.5 | 630 nm | 5.4% | 2.3% | 95.0% |
| | Green pixel region | 0.302 | 0.540 | 67.0 | 535 nm | 4.2% | 88.8% | 8.1% |
| | Blue pixel region | 0.147 | 0.158 | 22.0 | 450 nm | 87.8% | 28.9% | 2.3% |
| Transmission part | Red pixel region | 0.650 | 0.335 | 20.1 | 630 nm | 0.4% | 0.1% | 94.3% |
| | Green pixel region | 0.275 | 0.600 | 53.7 | 535 nm | 0.2% | 82.3% | 0.7% |
| | Blue pixel region | 0.135 | 0.102 | 11.6 | 450 nm | 82.4% | 8.6% | 0.1% |

(Common Condition-Liquid Crystal Layer)

A liquid crystal is as follows.

A refractive index in a long axis direction was 1.60 at any wavelength. A refractive index in a short axis direction was 1.50 at any wavelength. An elastic constant was 13.2 pN (splay), 6.5 pN (twist) and 18.3 pN (bend). A dielectric constant in the long axis direction was 3.1. The dielectric constant in the short axis direction was 8.3, and a pretilt angle was 89 degrees.

(Common Condition-Retardation Thin Film)

A retardation thin film is a uniaxial optical anisotropic device having in-plane retardation. An average refractive index was 1.567 at wavelength of 450 nm, 1.553 at wavelength of 535 nm and 1.546 at wavelength of 630 nm. Transmittance was 100% at any wavelength.

(Common Condition-Constitution of a Display Device)

A layer structure is as follows.

A reflection part of a pixel is structured in order from a viewing side with a polarizing plate/a glass substrate/a color filter layer/a retardation thin film/a liquid crystal layer/a reflecting plate. A thickness of a liquid crystal layer is 1.5 μm.

A transmission part of a pixel is structured in order from a viewing side with a polarizing plate/a glass substrate/a color filter layer/a retardation thin film/a liquid crystal layer/a glass substrate/a polarizing plate. A thickness of a liquid crystal layer is 3.0 μm.

A thickness of a retardation thin film is determined so that ¼(133.75 μm) of a center wavelength (535 nm) is obtained in a reflection part of a green pixel by respective calculations. A film thickness is identical in either a reflection part or a transmission part of respective color pixels. In a polarizing plate, absorption axis of a viewing side is 0 degree, and an absorption axis of a back light side is 90 degrees. A pre-twist angle of a liquid crystal layer and phase delay axis are 45 degrees.

A black display is obtained when a voltage of 0V is applied to a liquid crystal display. A white display is obtained when a voltage of 5V is applied to a liquid crystal display. In such case, a spectral transmittance in each frontal direction is determined. A C light source is used as a light source, and contrast is calculated. In addition, reflection at an interface other than a reflecting plate is not considered.

Simulation Example 1

Figure 13:
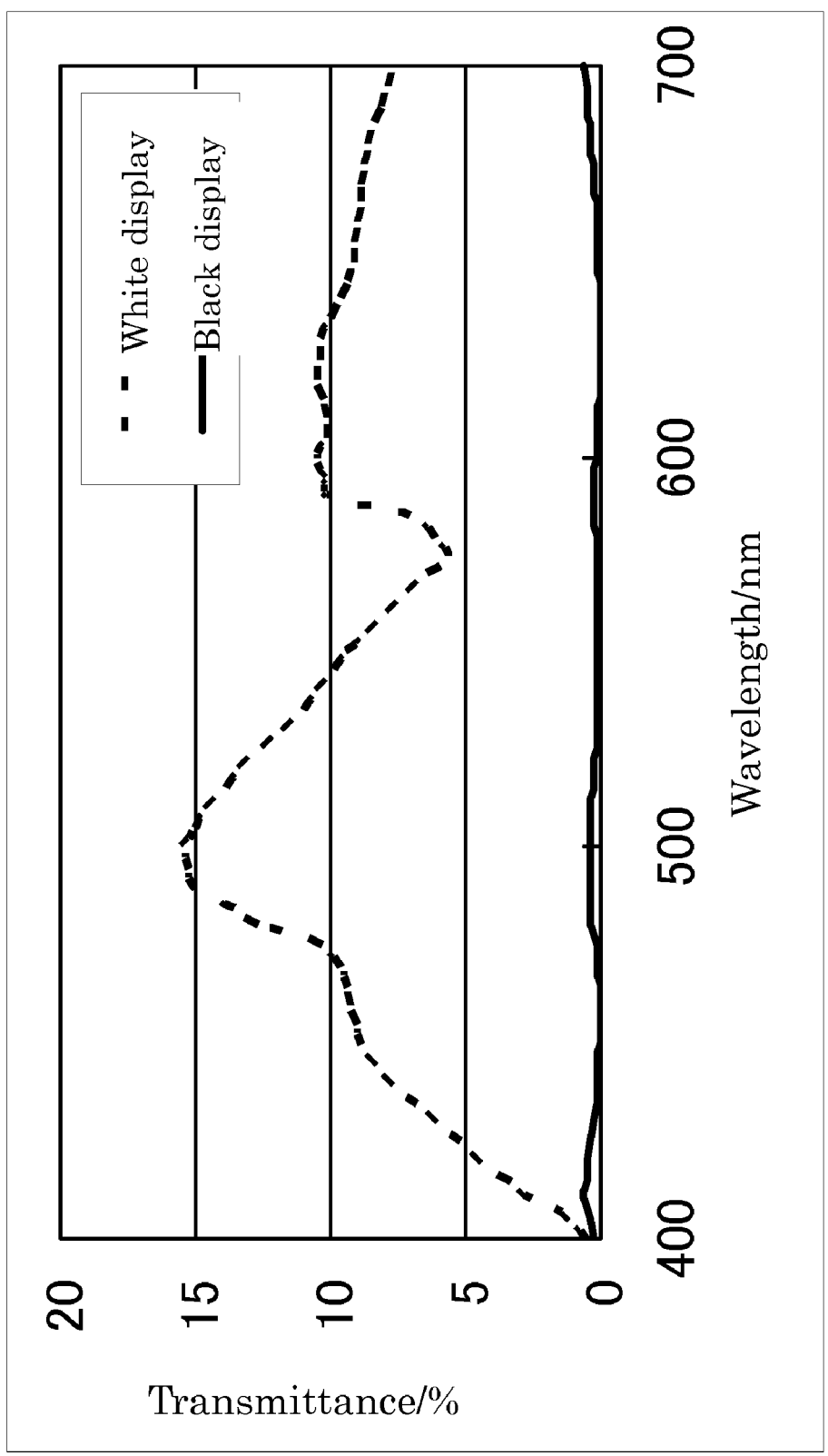
FIG. 13 shows reflectance of white display and black display of reflection part.

In a retardation film, optical calculation is performed as follows. A film thickness is 1.55 μm. Birefringence index is 0.101 at a reflection part of a red pixel, 0.086 at a reflection part of a green pixel, and $3.0 \times 10^{-4}$ at a transmission part of a pixel. Contrast is 67 at a reflection part, and 8470 at a transmission part. Table 8 shows determined characteristics of a retardation thin film. FIG. 13 shows reflectance of a white display and a black display of a reflection part.

TABLE 8

|  |  | Characteristics of retardation thin film | | | $\Delta n[fr]/\lambda d[fr]$ in the case where a red pixel is used as a basis. (note 1) | $n[fr]/\lambda d[fr]$ in the case where a green pixel is used as a basis. (note 2) | $\Delta n[fr]/\lambda d[fr]$ in the case where a blue pixel is used as a basis. (note 3) |
|---|---|---|---|---|---|---|---|
|  |  | Center wavelength | Film thickness | Birefringence index |  |  |  |
| Reflection part | Red pixel region | 630 nm | 1.55 μm | 0.101 | 1.000 | 0.997 | 0.975 |
|  | Green pixel region | 535 nm | 1.55 μm | 0.088 | 1.003 | 1.000 | 0.978 |
|  | Blue pixel region | 450 nm | 1.55 μm | 0.074 | 1.026 | 1.023 | 1.000 |
| Transmission part | Red pixel region | 630 nm | 1.55 μm | $3.0 \times 10^{-4}$ |  |  |  |
|  | Green pixel region | 535 nm | 1.55 μm | $3.0 \times 10^{-4}$ |  |  |  |
|  | Blue pixel region | 450 nm | 1.55 μm | $3.0 \times 10^{-4}$ |  |  |  |

(note 1): $\Delta n[fr]$ is a ratio of in-plane birefringence index of respective pixels to in-plane birefringence of a reflection part of the red pixel. $\lambda d[fr]$ is $(d[f1] \times \lambda[f2])/(d[f2] \times \lambda[f1])$. $d[f1]$ is a film thickness of a retardation thin film in a reflection part of a red pixel. $d[f2]$ is a film thickness of a retardation thin film in respective pixels. $\lambda[f1]$ is a center wavelength of a color of a reflection part of a red pixel. $\lambda[f2]$ is a center wavelength of a color of respective pixels. Hereinafter, these definitions are applied to Tables 9-13.
(note 2): the value is defined the same as note 1. $\Delta n[fr]$ is a ratio of in-plane birefringence index of respective pixels to in-plane birefringence of a reflection part of the green pixel. $d[f1]$ is a film thickness of a retardation thin film in a reflection part of a green pixel. $\lambda[f1]$ is a center wavelength of a color of a reflection part of a green pixel. Hereinafter, these definitions are applied to Tables 9-13.
(note 3): the value is defined the same as note 1. $\Delta n[fr]$ is a ratio of in-plane birefringence index of a pixel to in-plane birefringence of a reflection part of a blue pixel. $d[f1]$ is a film thickness of a retardation thin film in a reflection part of a blue pixel. $\lambda[f1]$ is a center wavelength of a color of a reflection part of a blue pixel. Hereinafter, these definitions are applied to Tables 9-13.

Simulation Example 2

Figure 14:
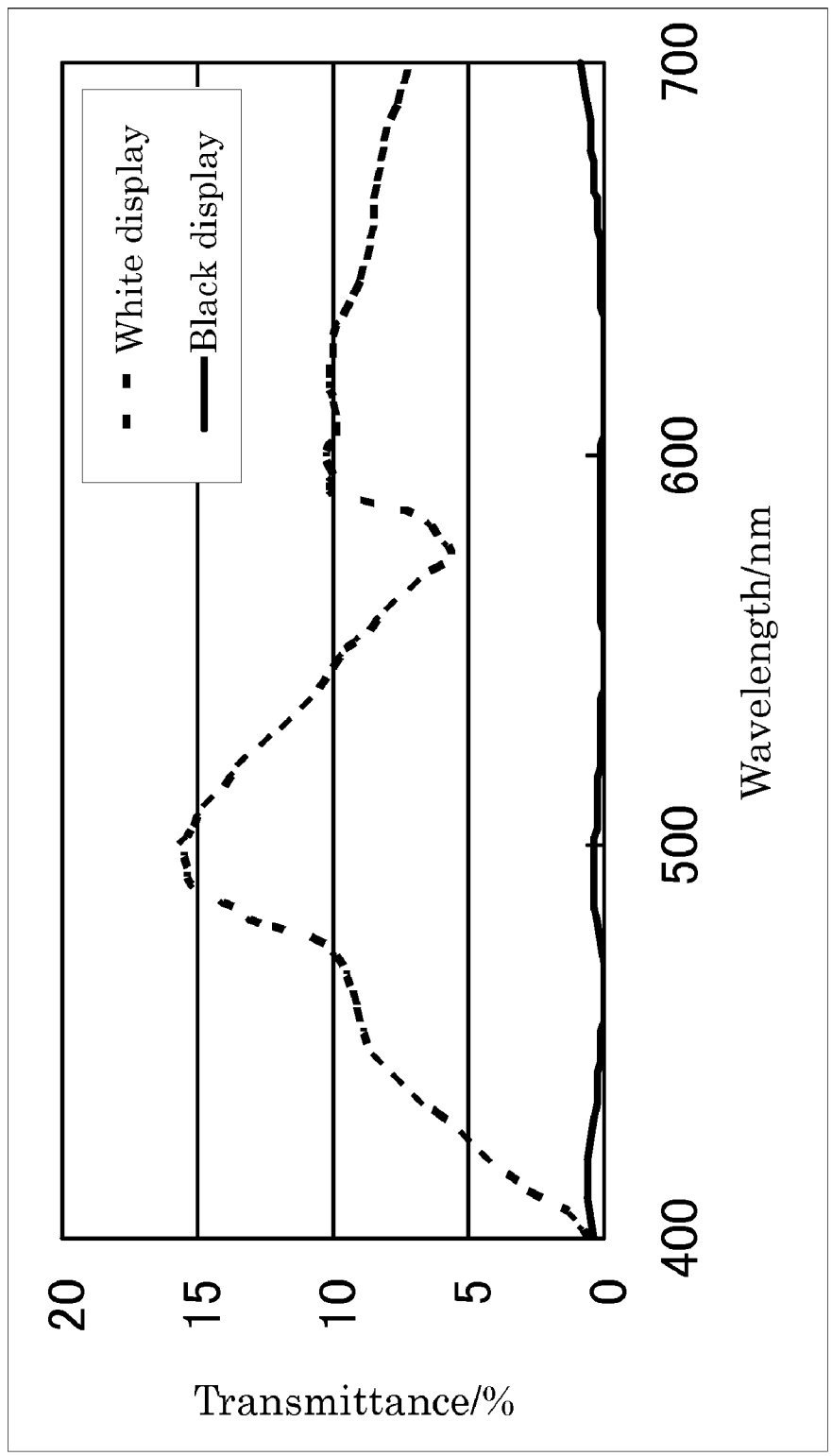
FIG. 14 shows reflectance of white display and black display of reflection part.

In a retardation thin film, optical calculation is performed as follows. A film thickness is 1.51 μm. Birefringence index is 0.101 at a reflection part of a red pixel, 0.089 at a reflection part of a green pixel, 0.079 at a reflection part of a blue pixel and $5.0 \times 10^{-4}$ at a transmission part of a pixel. Contrast is 82 at a reflection part and 7580 at a transmission part. Table 9 shows determined characteristics of a retardation film. FIG. 14 shows reflectance of a white display and a black display.

TABLE 9

| | | Characteristics of retardation thin film | | | $\Delta n[fr]/\lambda d[fr]$ in the case where a red pixel is used as a basis. | $\Delta n[fr]/\lambda d[fr]$ in the case where a green pixel is used as a basis. | $\Delta n[fr]/\lambda d[fr]$ in the case where a blue pixel is used as a basis. |
|---|---|---|---|---|---|---|---|
| | | Center wavelength | Film thickness | Birefringence index | | | |
| Reflection part | Red pixel region | 630 nm | 1.51 μm | 0.101 | 1.000 | 0.964 | 0.913 |
| | Green pixel region | 535 nm | 1.51 μm | 0.089 | 1.038 | 1.000 | 0.948 |
| | Blue pixel region | 450 nm | 1.51 μm | 0.079 | 1.095 | 1.055 | 1.000 |
| Transmission part | Red pixel region | 630 nm | 1.51 μm | $5.0 \times 10^{-4}$ | | | |
| | Green pixel region | 535 nm | 1.51 μm | $5.0 \times 10^{-4}$ | | | |
| | Blue pixel region | 450 nm | 1.51 μm | $5.0 \times 10^{-4}$ | | | |

Simulation Example 3

Figure 15:
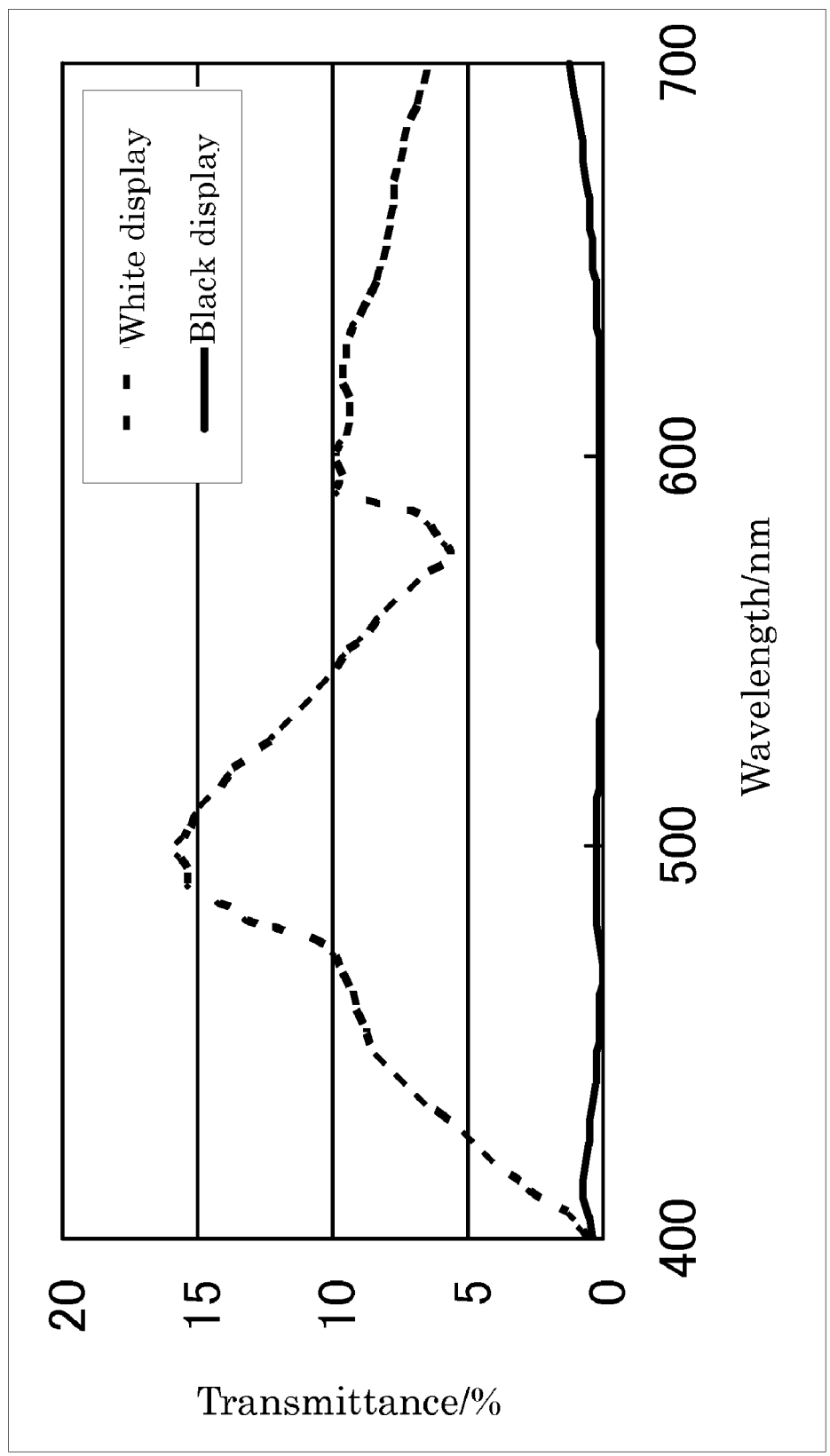
FIG. 15 shows reflectance of white display and black display of reflection part.

In a retardation thin film, optical calculation is performed as follows. A film thickness is 1.45 μm. Birefringence index is 0.101 at a reflection part of a red pixel, 0.092 at a reflection part of a green pixel, 0.084 at a reflection part of a blue pixel and $7.0 \times 10^{-4}$ at a transmission part of a pixel. Contrast is 80 at a reflection part and 6700 at a transmission part. Table 10 shows determined characteristics of a retardation film. FIG. 15 shows reflectance of a white display and a black display.

Simulation Example 4

Figure 16:
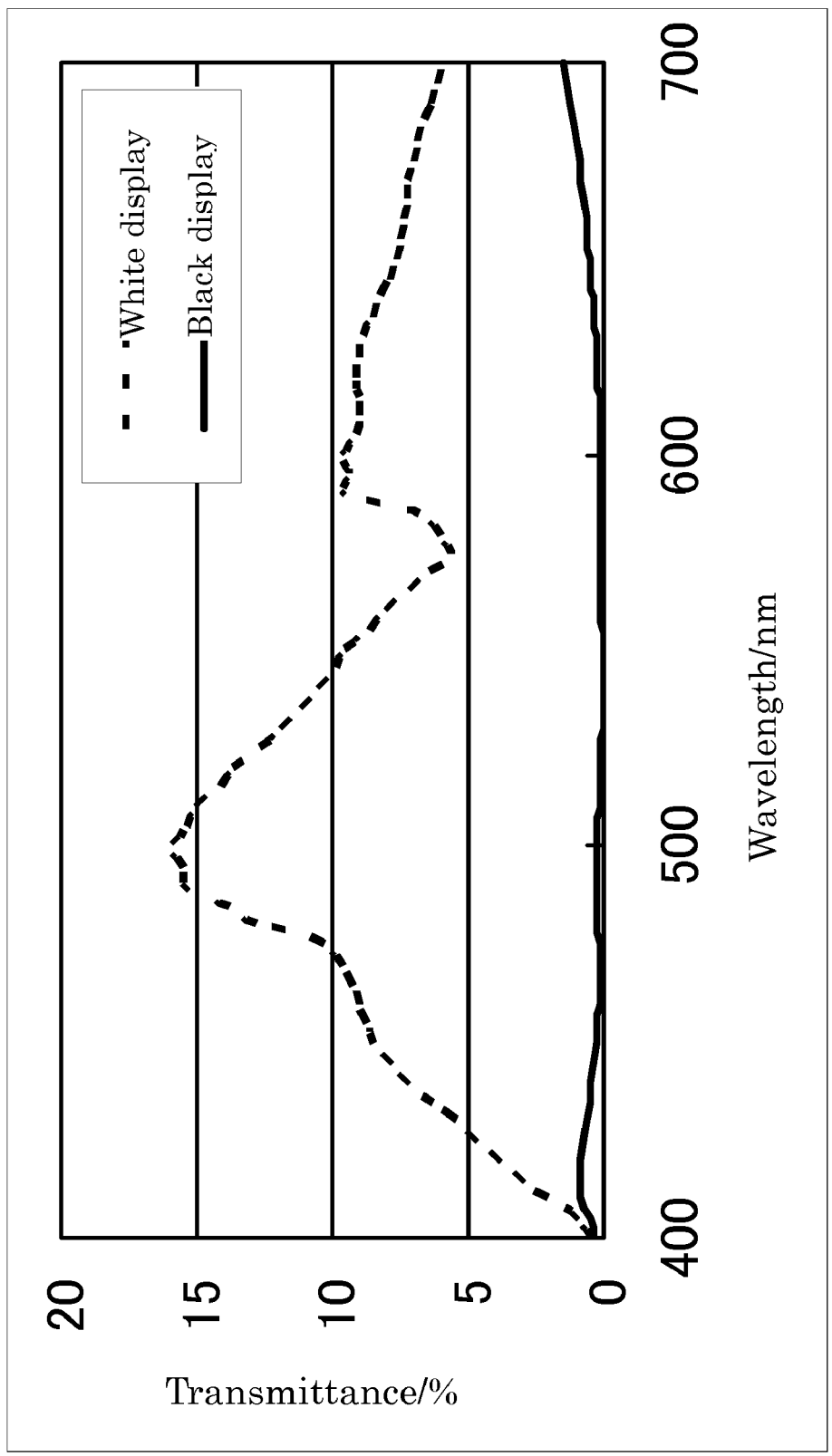
FIG. 16 shows reflectance of white display and black display of reflection part.

In a retardation thin film, optical calculation is performed as follows. A film thickness is 1.41 μm. Birefringence index is 0.101 at a reflection part of a red pixel, 0.095 at a reflection part of a green pixel, 0.089 at a reflection part of a blue pixel and $9.0 \times 10^{-4}$ at a transmission part of a pixel. Contrast is 76 at a reflection part and 5880 at a transmission part. Table 11 shows determined characteristics of a retardation film. FIG. 16 shows reflectance of a white display and a black display.

TABLE 10

| | | Characteristics of retardation thin film | | | $\Delta n[fr]/\lambda d[fr]$ in the case where a red pixel is used as a basis. | $\Delta n[fr]/\lambda d[fr]$ in the case where a green pixel is used as a basis. | $\Delta n[fr]/\lambda d[fr]$ in the case where a blue pixel is used as a basis. |
|---|---|---|---|---|---|---|---|
| | | Center wavelength | Film thickness | Birefringence index | | | |
| Reflection part | Red pixel region | 630 nm | 1.45 μm | 0.101 | 1.000 | 0.932 | 0.859 |
| | Green pixel region | 535 nm | 1.45 μm | 0.092 | 1.073 | 1.000 | 0.921 |
| | Blue pixel region | 450 nm | 1.45 μm | 0.084 | 1.164 | 1.086 | 1.000 |
| Transmission part | Red pixel region | 630 nm | 1.45 μm | $7.0 \times 10^{-4}$ | | | |
| | Green pixel region | 535 nm | 1.45 μm | $7.0 \times 10^{-4}$ | | | |
| | Blue pixel region | 450 nm | 1.45 μm | $7.0 \times 10^{-4}$ | | | |

TABLE 11

| | | Characteristics of retardation thin film | | | Δn[fr]/λ d[fr] in the case where a red pixel is used as a basis. | Δn[fr]/λ d[fr] in the case where a green pixel is used as a basis. | Δn[fr]/λ d[fr] in the case where a blue pixel is used as a basis. |
|---|---|---|---|---|---|---|---|
| | | Center wavelength | Film thickness | Birefringence index | | | |
| Reflection part | Red pixel region | 630 nm | 1.41 μm | 0.101 | 1.000 | 0.903 | 0.811 |
| | Green pixel region | 535 nm | 1.41 μm | 0.095 | 1.108 | 1.000 | 0.898 |
| | Blue pixel region | 450 nm | 1.41 μm | 0.089 | 1.234 | 1.144 | 1.000 |
| Transmission part | Red pixel region | 630 nm | 1.41 μm | $9.0 \times 10^{-4}$ | | | |
| | Green pixel region | 535 nm | 1.41 μm | $9.0 \times 10^{-4}$ | | | |
| | Blue pixel region | 450 nm | 1.41 μm | $9.0 \times 10^{-4}$ | | | |

Simulation Example 5

Figure 17:
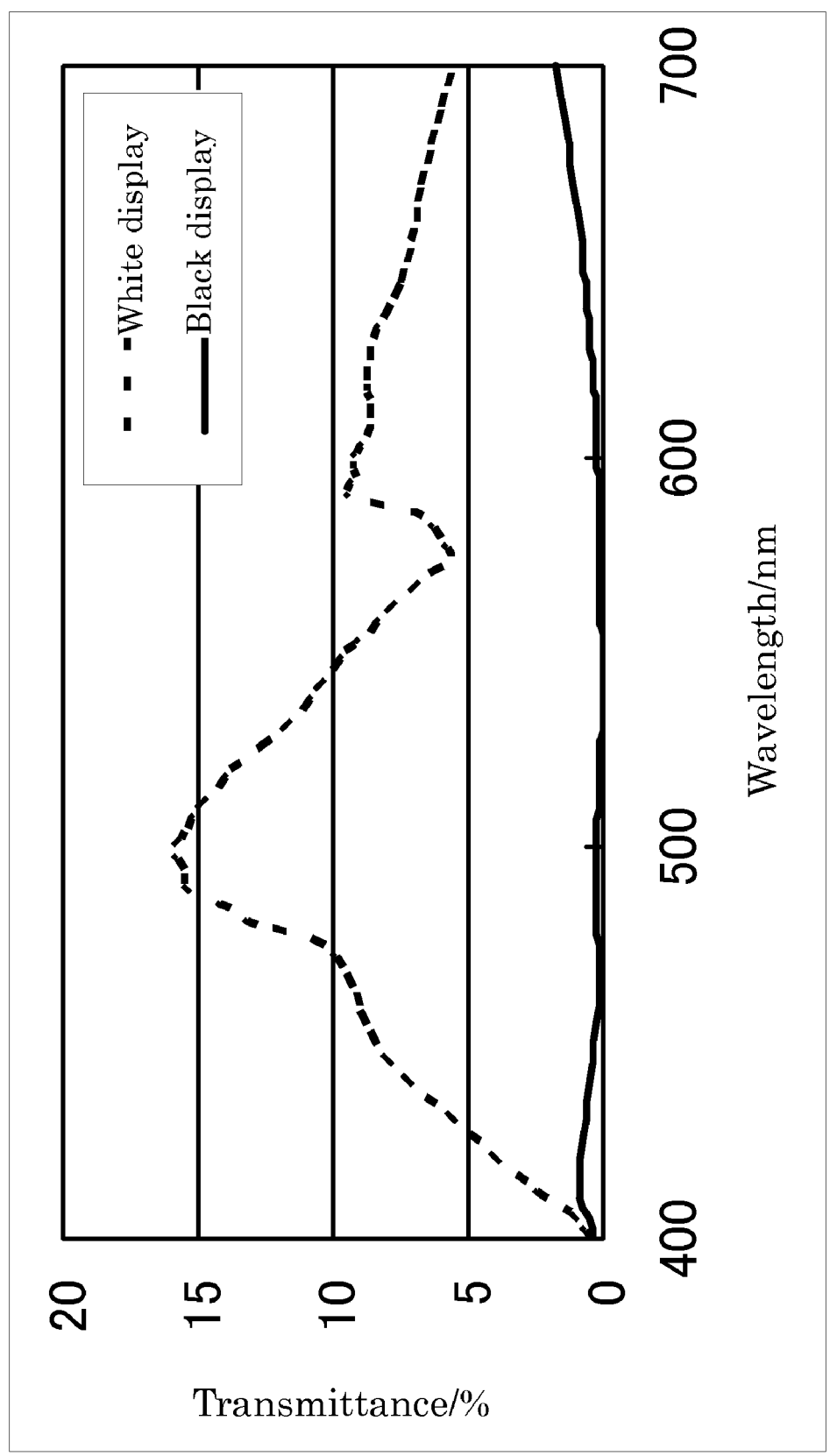
FIG. 17 shows reflectance of white display and black display of reflection part.

In a retardation thin film, optical calculation is performed as follows. A film thickness is 1.37 μm. Birefringence index is 0.101 at a reflection part of a red pixel, 0.098 at a reflection part of a green pixel, 0.094 at a reflection part of a blue pixel and $1.1 \times 10^{-3}$ at a transmission part of a pixel. Contrast is 64 at a reflection part and 5160 at a transmission part. Table 12 shows determined characteristics of a retardation film. FIG. 17 shows reflectance of a white display and a black display.

Simulation Comparative Example

Figure 18:
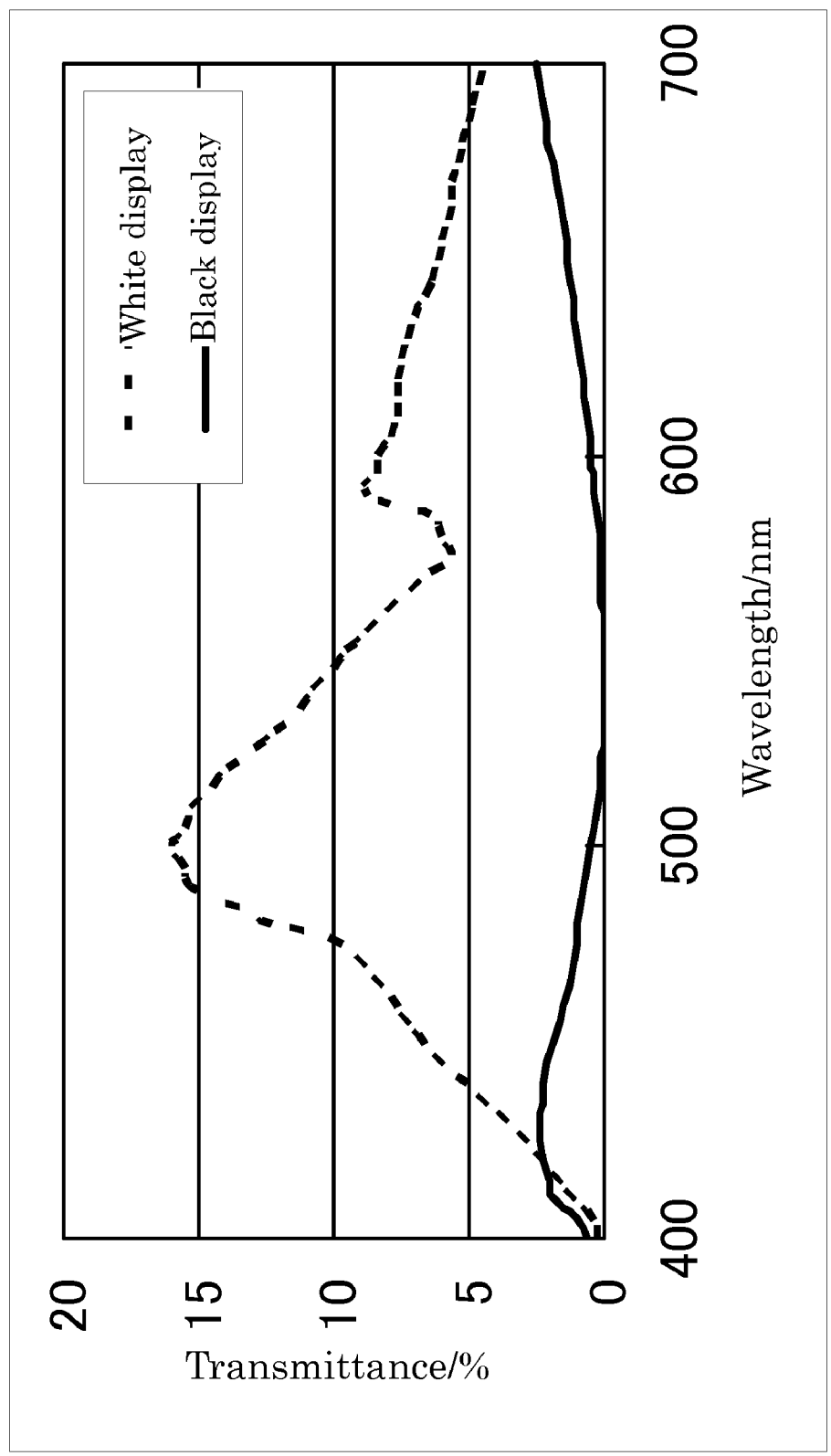
FIG. 18 shows reflectance of white display and black display of reflection part.

In a retardation thin film, optical calculation is performed as follows. A film thickness is 1.31 μm. Birefringence index is 0.099 at a reflection part of a red pixel, 0.103 at a reflection part of a green pixel, 0.113 at a reflection part of a blue pixel and $3.0 \times 10^{-3}$ at a transmission part of a pixel. Contrast is 32 at a reflection part and 1510 at a transmission part. Table 13 shows determined characteristics of a retardation film. FIG. 18 shows reflectance of a white display and a black display.

TABLE 12

| | | Characteristics of retardation thin film | | | Δn[fr]/λ d[fr] in the case where a red pixel is used as a basis. | Δn[fr]/λ d[fr] in the case where a green pixel is used as a basis. | Δn[fr]/λ d[fr] in the case where a blue pixel is used as a basis. |
|---|---|---|---|---|---|---|---|
| | | Center wavelength | Film thickness | Birefringence index | | | |
| Reflection part | Red pixel region | 630 nm | 1.37 μm | 0.101 | 1.000 | 0.875 | 0.767 |
| | Green pixel region | 535 nm | 1.37 μm | 0.098 | 1.143 | 1.000 | 0.877 |
| | Blue pixel region | 450 nm | 1.37 μm | 0.094 | 1.303 | 1.140 | 1.000 |
| Transmission part | Red pixel region | 630 nm | 1.37 μm | $1.1 \times 10^{-3}$ | | | |
| | Green pixel region | 535 nm | 1.37 μm | $1.1 \times 10^{-3}$ | | | |
| | Blue pixel region | 450 nm | 1.37 μm | $1.1 \times 10^{-3}$ | | | |

TABLE 13

| | | Characteristics of retardation thin film | | | $\Delta n[fr]/\lambda d[fr]$ in the case where a red pixel is used as a basis. | $\Delta n[fr]/\lambda d[fr]$ in the case where a green pixel is used as a basis. | $\Delta n[fr]/\lambda d[fr]$ in the case where a blue pixel is used as a basis. |
|---|---|---|---|---|---|---|---|
| | | Center wavelength | Film thickness | Birefringence index | | | |
| Reflection part | Red pixel region | 630 nm | 1.31 μm | 0.099 | 1.000 | 0.816 | 0.626 |
| | Green pixel region | 535 nm | 1.31 μm | 0.103 | 1.225 | 1.000 | 0.767 |
| | Blue pixel region | 450 nm | 1.31 μm | 0.113 | 1.598 | 1.304 | 1.000 |
| Transmission part | Red pixel region | 630 nm | 1.31 μm | $3.0 \times 10^{-3}$ | | | |
| | Green pixel region | 535 nm | 1.31 μm | $3.0 \times 10^{-3}$ | | | |
| | Blue pixel region | 450 nm | 1.31 μm | $3.0 \times 10^{-3}$ | | | |

(Simulation Results)

As shown in the above simulation examples, in the case where $\Delta n[fr]/\lambda d[fr]$ of a retardation thin film at a reflection part of a pixel is equal to or more than 0.75 and equal to or less than 1.35, contrast is about 60-80. In addition, in the case where birefringence index of a retardation thin film at a transmission part of a pixel is less than $1.2 \times 10^{-3}$, contrast is equal to or more than 5000. On the other hand, as shown in the simulation comparative example, in the case where a minimum value of $\Delta n[fr]/\lambda d[fr]$ of a retardation thin film at a reflection part of a pixel is 0.626 and a maximum value is 1.598 and contrast is 32. Birefringence index of a retardation thin film at a transmission part of a pixel is $3.0 \times 10^{-3}$, and contrast is just above 1500. Table 14 shows a relationship between $\Delta n[fr]/\lambda d[fr]$ and contrast in a reflection part of a pixel, and a relationship between birefringence index and contrast in a transmission part of a pixel.

TABLE 14

| | A reflection part of a pixel | | | A transmission part of a pixel | |
|---|---|---|---|---|---|
| | Minimum value of $\Delta n[fr]/\lambda d[fr]$ (note 1) | maximum value of $\Delta n[fr]/\lambda d[fr]$ (note 2) | contrast | Birefringence index | contrast |
| Simulation example 1 | 0.975 | 1.026 | 67 | $3.0 \times 10^{-4}$ | 8470 |
| Simulation example 2 | 0.913 | 1.095 | 82 | $5.0 \times 10^{-4}$ | 7582 |
| Simulation example 3 | 0.859 | 1.164 | 80 | $7.0 \times 10^{-4}$ | 6700 |
| Simulation example 4 | 0.811 | 1.234 | 76 | $9.0 \times 10^{-4}$ | 5880 |
| Simulation example 5 | 0.767 | 1.303 | 64 | $1.1 \times 10^{-3}$ | 5160 |
| Simulation comparative example | 0.626 | 1.598 | 32 | $3.0 \times 10^{-3}$ | 1520 |

(note 1): minimum value of $\Delta n[fr]/\lambda d[fr]$ in the case where a red pixel, a green pixel and a blue pixel are used as a basis in respective Tables 8-13
(note 2): maximum value of $\Delta n[fr]/\lambda d[fr]$ in the case where a red pixel, a green pixel and a blue pixel are used as a basis in respective Tables 8-13

INDUSTRIAL APPLICABILITY

The present invention can be used for a color filter substrate and a method for manufacturing the color filter substrate, the color filter substrate used for a liquid crystal display device and other display devices. In particular, the present invention can be used for a matrix type color liquid crystal display device for a planar type image display device etc.

What is claimed is:
1. A liquid crystal display device, comprising:
a first substrate;
a second substrate facing the first substrate;
a first polarizing plate arranged on an opposite surface to the second substrate among both sides of the first substrate;
a second polarizing plate arranged on an opposite surface to the first substrate among both sides of the second substrate, and arranged so that a direction of an absorption axis of the second polarizing plate being perpendicular to a direction of an absorption axis of the first polarizing plate;

a liquid crystal layer sandwiched between the first substrate and the second substrate;

a color filter layer arranged between the liquid crystal layer and the first or the second substrate, the color filter layer having a plurality of pixels of two or more colors and each pixel having a reflection part and a transmission part; and a retardation thin film formed from a liquid crystal fixed layer, and arranged between the first substrate and the second substrate, wherein, in the retardation thin film, as for at least one layer among the pixels, birefringence indexes are different due to different degree of alignment of the liquid crystal fixed layer for respective regions corresponding to any one or some of respective colors, the transmission part and the reflection part, wherein the retardation thin film has in-plane birefringence index satisfying $0.75 \leqq \Delta n[fr]/\lambda d[fr] \leqq 1.35$ for a region corresponding to the reflection part of a pixel and satisfying $\Delta n[t] < 1.2 \times 10^{-3}$ for a region corresponding to the transmission part of a pixel, wherein $\lambda d[fr] = (d[f1] \times \lambda[f2])/(d[f2] \times \lambda[f1])$, and wherein $\Delta n[t]$ is an in-plane birefringence in a region corresponding to an image transmission part, and wherein $\Delta n[fr]$ is a ratio of an in-plane birefringence index in a region corresponding to an image reflection part of a first color to an in-plane birefringence index in a region corresponding to an image reflection part of an arbitrary second color, and wherein $d[f1]$ and $d[f2]$ are thicknesses of retardation layers in regions corresponding to image reflection parts of the first color and the second color, respectively, and wherein $\lambda[f1]$ and $\lambda[f2]$ are center wavelengths of colors of image reflection parts of the first color and the second color, respectively.

2. The liquid crystal display device according to claim 1, wherein a direction of a phase delay axis of the retardation thin film having the in-plane birefringence is substantially identical in the entire retardation thin film.

3. The liquid crystal display device according to claim 1, wherein the liquid crystal layer sandwiched between the first substrate and the second substrate is aligned substantially vertical to the first and second substrates when a voltage is not applied.

4. The liquid crystal display according to claim 1, wherein the retardation thin film is formed by any one or both of polymerization and cross-linking of a compound including a thermotropic liquid crystal.

5. A method for manufacturing the liquid crystal display device according to claim 1, comprising:
  (a) forming a thin film in which a liquid crystal compound is aligned in a predetermined direction, by applying a solution including a compound showing a thermotropic liquid crystal property and capable of being any one or both of polymerized and cross-linked by at least light on the first substrate;
  (b) exposing the first substrate to light so that exposure amounts are different for regions of the first substrate corresponding to predetermined patterns of respective colors of the color filter layer;
  (c) heating the first substrate to a temperature equal to or greater than an isotropic phase transition temperature of the liquid crystal compound;
  (d) exposing entirely the first substrate to light while the first substrate is at a temperature that keeps the liquid crystal compound in an isotropic phase; and
  (e) making the first substrate face a second substrate in order to arrange the liquid crystal compound between the first and second substrates.

6. The method for manufacturing the liquid crystal display device according to claim 5,
  wherein the thin film formed in process (a) has a film thickness that is uniform over the entire first substrate.

7. The method for manufacturing the liquid crystal display device according to claim 5,
  wherein the compound showing the thermotropic liquid crystal property is capable of being any one or both of polymerized and cross-linked by both light and heat on the first substrate,
  and
  wherein, instead of process (d), the first substrate is heated to a temperature equal to or greater than the isotropic phase transition temperature of the liquid crystal compound and equal to or greater than a temperature at which the liquid crystal compound becomes any one or both of polymerized and cross-linked.

8. The method for manufacturing the liquid crystal display device according to claim 5,
  wherein, instead of process (d), light irradiation is performed for a portion of the first substrate other than a region of the first substrate where light irradiation of maximum exposure amount is performed during process (b), and the light irradiation is performed while the first substrate is at the temperature that keeps the liquid crystal compound in the isotropic phase.

9. The method for manufacturing the liquid crystal display device according to claim 8,
  wherein the light irradiation while the first substrate is at the temperature that keeps the liquid crystal compound in the isotropic phase, is performed such that a sum total of an exposure amount on the portion of the first substrate in claim 8 and
  an exposure amount on the same portion of the first substrate during process (b) is equal to an exposure amount for the region where light irradiation of maximum exposure amount is performed during process (b).

10. The method for manufacturing the liquid crystal display device according to claim 5,
  wherein the color filter layer is formed before process (a).

11. The method for manufacturing the liquid crystal display device according to claim 5,
  wherein the color filter layer is formed after process (d).

12. The method for manufacturing the liquid crystal display device according to claim 5,
  wherein processes (a) through (d) to be performed for the first substrate is performed for the second substrate instead of the first substrate,
  and
  wherein a TFT layer is formed on the second substrate before the performance of process (a) on the second substrate.

* * * * *